US010341007B2

(12) United States Patent
Song et al.

(10) Patent No.: US 10,341,007 B2
(45) Date of Patent: Jul. 2, 2019

(54) METHOD AND APPARATUS FOR TRANSMITTING AND RECEIVING DATA USING CACHE MEMORY IN WIRELESS COMMUNICATION SYSTEM SUPPORTING RELAY NODE

(71) Applicants: LG ELECTRONICS INC., Seoul (KR); RESEARCH & BUSINESS FOUNDATION SUNGKYUNKWAN UNIVERSITY, Suwon-si, Gyeonggi-do (KR); KOREA ADVANCED INSTITUTE OF SCIENCE AND TECHNOLOGY, Daejeon (KR)

(72) Inventors: Hojin Song, Daejeon (KR); Wan Choi, Seoul (KR); Dongin Kim, Seoul (KR); Hanbyul Seo, Seoul (KR); Byounghoon Kim, Seoul (KR)

(73) Assignees: LG ELECTRONICS INC., Seoul (KR); RESEARCH & BUSINESS FOUNDATION SUNGKYUNKWAN UNIVERSITY, Suwon-Si, Gyeonggi-Do (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 85 days.

(21) Appl. No.: 15/525,347

(22) PCT Filed: Nov. 10, 2015

(86) PCT No.: PCT/KR2015/012030
§ 371 (c)(1),
(2) Date: May 9, 2017

(87) PCT Pub. No.: WO2016/076594
PCT Pub. Date: May 19, 2016

(65) Prior Publication Data
US 2018/0241459 A1    Aug. 23, 2018

Related U.S. Application Data

(60) Provisional application No. 62/077,856, filed on Nov. 10, 2014.

(51) Int. Cl.
*H04B 7/155*    (2006.01)
*H04B 7/0452*    (2017.01)
(Continued)

(52) U.S. Cl.
CPC ....... *H04B 7/15507* (2013.01); *H04B 7/0452* (2013.01); *H04B 7/0456* (2013.01);
(Continued)

(58) Field of Classification Search
None
See application file for complete search history.

(56) References Cited

U.S. PATENT DOCUMENTS 7,924,761 B1 *   4/2011   Stevens ............. H03M 13/3761
                                              370/315
8,004,963 B2 *   8/2011   Chang ................... H04L 1/0071
                                              370/216
(Continued)

OTHER PUBLICATIONS

Alimi et al., "iPack: in-Network Packet Mixing for High Throughput Wireless Mesh Networks," In: INFOCOM 2008, 27th Conference on Computer Communications, Apr. 13-18, 2008, 9 pages.
(Continued)

*Primary Examiner* — Candal Elpenord
(74) *Attorney, Agent, or Firm* — Birch, Stewart, Kolasch & Birch, LLP

(57) ABSTRACT

The present invention relates to a wireless communication system. More particularly, the present invention relates to a
(Continued)

method for transmitting a content using a cache memory, and a method for transmitting a content using a cache memory by a relay node according to the present invention may comprise the steps of: storing a first packet among a plurality of the packets constituting the content in the cache memory; decoding a second packet among the plurality of packets constituting the content; and when the second packet has been successfully decoded, combining the first packet and the second packet and transmitting the combined packet to a terminal, wherein the second packet is not already stored in the cache memory.

12 Claims, 12 Drawing Sheets

(51) Int. Cl.
| | | |
|---|---|---|
| *H04W 88/04* | (2009.01) | |
| *H04W 28/14* | (2009.01) | |
| *H04L 1/18* | (2006.01) | |
| *H04W 72/04* | (2009.01) | |
| *H04B 7/0456* | (2017.01) | |

(52) U.S. Cl.
CPC ....... *H04B 7/15521* (2013.01); *H04L 1/1887* (2013.01); *H04W 28/14* (2013.01); *H04W 88/04* (2013.01); *H04L 1/1812* (2013.01); *H04W 72/0406* (2013.01)

(56) References Cited

U.S. PATENT DOCUMENTS

| | | | |
|---|---|---|---|
| 9,226,196 B2* | 12/2015 | Callard | H04W 28/065 |
| 2010/0296432 A1* | 11/2010 | Mehta | H04B 7/15592 |
| | | | 370/315 |
| 2012/0188934 A1 | 7/2012 | Liu et al. | |
| 2012/0201193 A1* | 8/2012 | Sugiyama | H04B 7/155 |
| | | | 370/315 |
| 2012/0314655 A1 | 12/2012 | Xue et al. | |
| 2013/0151584 A1 | 6/2013 | Westphal | |

OTHER PUBLICATIONS

Oh et al., "Robust MANET Routing using Adaptive Path Redundancy and Coding," In: COMSNETS 2009, Communication Systems and Networks and Workshops, Jan. 5-10, 2009, 10 pages.

* cited by examiner (a)

(b)

(a)

(b)

METHOD AND APPARATUS FOR TRANSMITTING AND RECEIVING DATA USING CACHE MEMORY IN WIRELESS COMMUNICATION SYSTEM SUPPORTING RELAY NODE

CROSS REFERENCE TO RELATED APPLICATIONS:

This application is the National Phase of PCT International Application No. PCT/KR2015/012030, filed on Nov. 10, 2015, which claims priority under 35 U.S.C. 119(e) to U.S. Provisional Application No. 62/077,856, filed on Nov. 10, 2014, all of which are hereby expressly incorporated by reference into the present application.

TECHNICAL FIELD

The present disclosure relates to a wireless communication system, and more particularly, to a method and apparatus for transmitting and receiving data using a cache memory in a wireless communication system supporting a relay node.

BACKGROUND ART

FIG. 1 illustrates a Relay Node (RN) 120 and User Equipments (UEs) 141 and 142 within the coverage of a single evolved Node B (eNB or eNodeB) 110 in a wireless communication system. The RN 120 may forward data received from the eNodeB 110 to the UE 142 within the area of the RN 120, and forward data received from the UE 142 within the area of the RN 120 to the eNodeB 110. Further, the RN 120 may support extension of a high-rate area, an increase in communication quality at a cell edge, and providing of communication to an area outside the coverage of the eNodeB 110. In FIG. 1, there are a UE that receives a service directly from an eNodeB (hereinafter, referred to as a macro-UE or M-UE), such as the UE 141, and a UE that receives a service through the RN 120 (hereinafter, referred to as a Relay-UE or R-UE), such as the UE 142.

A radio link between the eNodeB 110 and the RN 120 is defined as a backhaul link. A link directed from the eNodeB 110 to the RN 120 is called a backhaul downlink, and a link directed from the RN 120 to the eNodeB 110 is called a backhaul uplink. Meanwhile, a radio link between the RN 120 and the UE 142 is defined as an access link. A link directed from the RN 120 to the UE 142 is called an access downlink, and a link directed from the UE 142 to the RN 120 is called an access uplink.

If the RN 120 autonomously controls a cell, the UE 142 may perceive the RN 120 as a general eNodeB. On the other hand, if another UE functions as the RN 120 (this RN is referred to as a UE-relay), the UE 142 may not recognize the existence of the RN 120.

DISCLOSURE

Technical Problem

An aspect of the present disclosure devised to solve the conventional problem is to provide a method for, if a Base Station (BS) transmits content to a User Equipment (UE) through a Relay Node (RN), transmitting the content successfully to the UE. Specifically, an aspect of the present disclosure is to provide a method for, if an RN transmits content to a UE, configuring the content.

Technical problems to be solved by the present disclosure are not limited to the above-mentioned technical problems, and other technical problems not mentioned herein may be clearly understood by those skilled in the art from description below.

Technical Solution

In an aspect of the present disclosure, a method for transmitting content using a cache memory by a relay node (RN) may include storing, in a cache memory, a first packet among a plurality of packets included in content, decoding a second packet among the plurality of packets included in the content, and if the second packet is successfully decoded, combining the first packet with the second packet, and transmitting the combined packets to a user equipment (UE).

In another aspect of the present disclosure, a method for receiving content using caching by a UE may include receiving a first packet included in content from a BS, receiving, from an RN, combined first and second packets at a time scheduled for the second packet, and recovering a frame based on at least the first packet and the second packet.

In another aspect of the present disclosure, an RN for transmitting content using a cache memory may include a cache memory for storing a first packet among a plurality of packets included in content, a processor for decoding a second packet among the plurality of packets included in the content, and if the second packet is successfully decoded, combining the first packet with the second packet, and a transceiver for transmitting the combined packets to a UE.

In another aspect of the present disclosure, a UE for receiving content using caching may include a transceiver for receiving a first packet included in content from a BS, and receiving, from an RN, combined first and second packets at a time scheduled for the second packet, a memory, and a processor for recovering a frame based on at least the first packet and the second packet.

In the aspects of the present disclosure, the following may be commonly applied.

Packets stored in the cache memory and packets that are not stored in the cache memory may be distributed uniformly.

Herein, the first packet may have an even-numbered index, and the second packet may have an odd-numbered index.

The first packet may be combined with the second packet based on superposition coding.

The first packet may be combined with the second packet based on orthogonal time division.

The first packet and the second packet may be transmitted together in resources allocated to the first packet.

The content may be transmitted in a plurality of frames, and the number of packets stored for an $i^{th}$ frame among the plurality of frames in the cache memory may be determined by equation 1, and equation 1 may be $$P1: \max_{X_1,\ldots,X_F} \min_i (P_i^{succ} PSNR_i)$$

subject to $$\sum_{i=1}^{F} X_i \leq M,$$

$$X_i \in \{0, \ldots, N_i\}, \forall i$$

Herein, $P_i^{succ}$ represents a probability of successfully reproducing the $i^{th}$ frame, $PSNR_i$ represents a peak signal-to-noise ratio (PSNR) of the $i^{th}$ frame, F represents the number of frames included in the content, M represents the number of packets storable in the cache memory, and Ni represents the number of packets required to transmit the $i^{th}$ frame.

Meanwhile, the second packet may be transmitted at a ratio of α with respect to the resources allocated to the first packet, the first packet may be transmitted at a ratio of 1-α with respect to the resources allocated to the first packet, and α may be a parameter for adjusting combination between the first packet and the second packet and determined based on a probability of decoding failure of the first packet and a probability of decoding failure of the second packet.

Herein, α may be determined by equation 2 and equation 3.

Equation 2 may be $$\epsilon^{coop}(\alpha) = Pr[\log_2(1 + |h_{SD}|^2 \gamma_{SD}) + \alpha \log_2(1 + |h_{RD}|^2 \gamma_{RD}) < R]$$

$$= 1 - \exp\left(\frac{1 - 2^{R/\alpha}}{\gamma_{RD}}\right) - \int_0^{2^{R/\alpha}-1} \frac{1}{\gamma_{RD}} \exp\left(-\frac{y}{\gamma_{RD}} - \frac{2^R - (1+y)^\alpha}{(1+y)^\alpha \gamma_{SD}}\right) dy$$

and equation 3 may be $$\epsilon^{RD,2}(\alpha) = Pr[(1-\alpha)\log_2(1 + |h_{RD}|^2 \gamma_{RD}) < R]$$

$$= \left(1 - \exp\left(-\frac{2^{R/(1-\alpha)} - 1}{\gamma_{RD}}\right)\right)$$

$\in^{coop}(\alpha)$ (represents a probability of failing in decoding an odd-numbered packet at a receiving UE, when the RN succeeds in overhearing, $h_{SD}$ represents short term fading between the BS and the receiving UE, $\gamma_{SD}$ represents long term fading between the BS and the receiving UE, $h_{RD}$ represents short term fading between the RN and the receiving UE, $\gamma_{RS}$ represents long term fading between the RN and the receiving UE, R represents the amount of transmitted data, and $\in^{RD,2}(\alpha)$ represents a probability of failing in decoding an even-numbered packet at the receiving UE, when the RN succeeds in overhearing.

If a part of the content is stored in the cache memory, hybrid automatic repeat request (HARQ) response information for the content may be transmitted.

Preferably, the response information may be an acknowledgment (ACK).

The foregoing general description and the following detailed description of the present disclosure are exemplary, and are given for an additional description of the appended claims.

Advantageous Effects

According to the present disclosure, if a Base Station (BS) transmits content to a User Equipment (UE) through a Relay Node (RN), a method for transmitting the content successfully to the UE may be provided. Further, if an RN transmits content to a UE, a method for configuring the content may be provided.

It will be appreciated by persons skilled in the art that the effects that can be achieved with the present disclosure are not limited to what has been particularly described herein-above and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

BEST MODE FOR CARRYING OUT THE INVENTION

Figure 1:
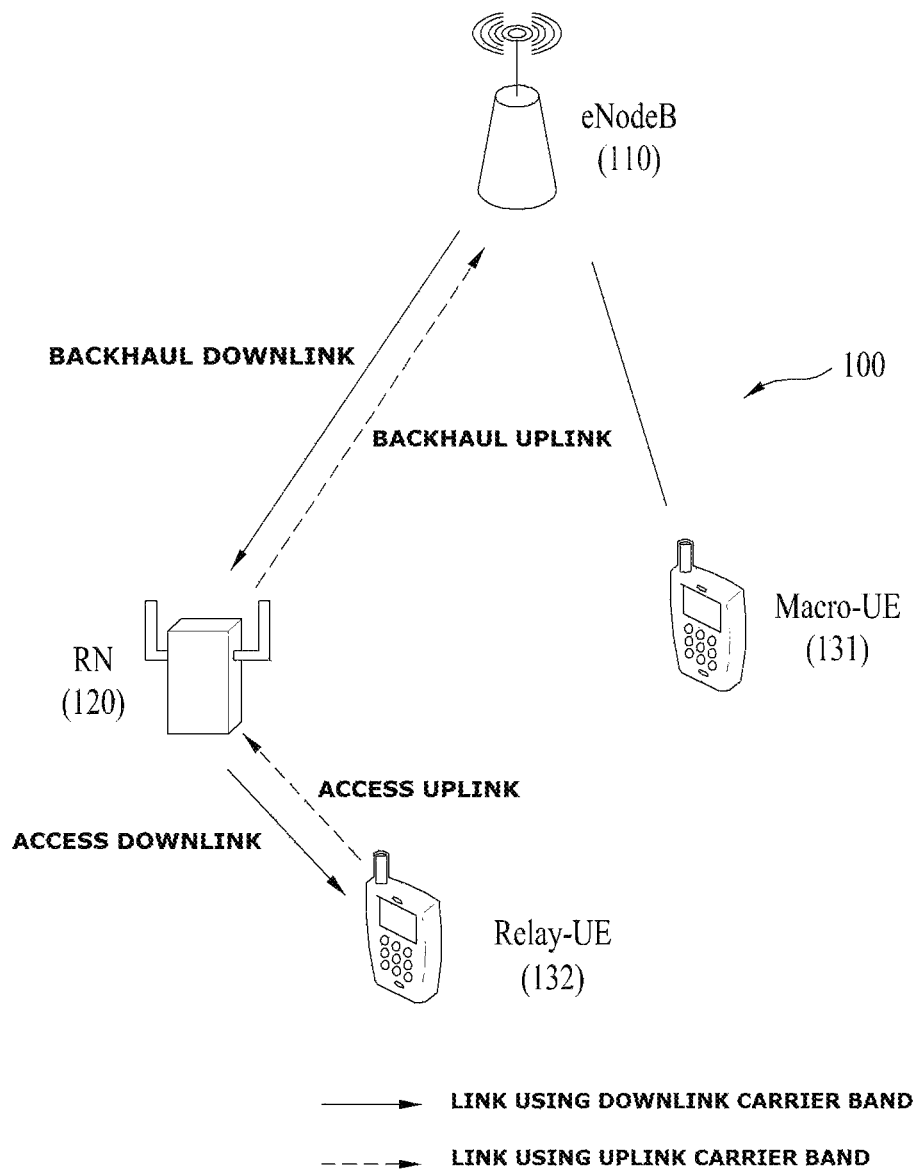
FIG. 1 is a view illustrating a wireless communication system including an evolved Node B (eNodeB or eNB), a Relay Node (RN), and User Equipments (UEs)

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc. The term relay may be replaced with a Relay Node (RN), Relay Station (RS), etc. In addition, the term terminal may be replaced with a UE, a Mobile Station (MS), a Subscriber Station (SS), a Mobile Subscriber Station (MSS), a Subscriber Station (SS), etc.

The following detailed description includes specific terms in order to provide a thorough understanding of the present disclosure. However, it will be apparent to those skilled in the art that the specific terms may be replaced with other terms without departing the technical spirit and scope of the present disclosure.

In some cases, a detailed description of known structures or devices will be avoided lest it should obscure the subject matter of the present disclosure, and the core functions of each structure and device may be illustrated in block diagram. In addition, like reference numerals denote the same components throughout the specification.

The embodiments of the present disclosure may be supported by standard specifications disclosed for at least one of an Institute of Electrical and Electronics Engineers (IEEE) 802 system, a 3rd Generation Partnership Project (3GPP) system, a 3GPP Long Term Evolution (LTE) system, an LTE-Advanced (LTE-A) system, and a 3GPP2 system. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

The technology as set forth below may be used for various wireless access systems including Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and so on. CDMA may be implemented as a radio technology such as Universal Terrestrial Radio Access (UTRA), CDMA2000, or the like. TDMA may be implemented as a radio technology such as Global System for Mobile communications/General Packet Radio Service/Enhanced Data Rates for GSM Evolution (GSM/GPRS/EDGE). OFDMA may be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, Evolved UTRA (E-UTRA), and so on. UTRA is a part of Universal Mobile Telecommunications System (UMTS). 3GPP LTE is a part of Evolved UMTS (E-UMTS) using E-UTRA. The 3GPP LTE adopts OFDMA in Downlink (DL) and SC-FDMA in Uplink (UL). LTE-A is an evolution of 3GPP LTE. WiMAX may be described by the IEEE 802.16e standard (e.g., WirelessMAN-OFDMA Reference system) and the advanced IEEE 802.16m standard (e.g., WirelessMAN-OFDMA Advanced system). For clarity, the following description is given in the context of 3GPP LTE and 3GPP LTE-A systems, which should not be construed as limiting the technical idea of the present disclosure.

Figure 2:
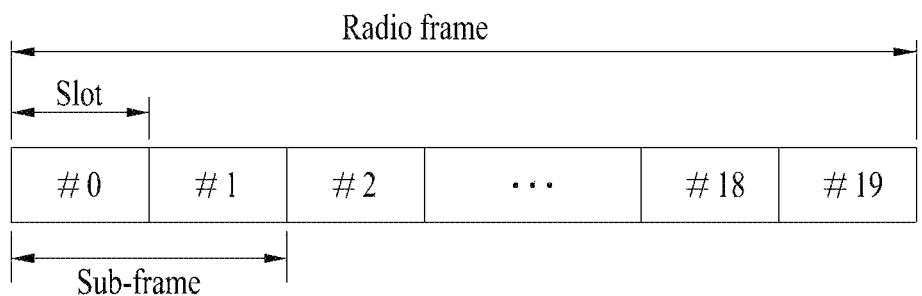
FIG. 2 is a view illustrating the structure of a radio frame in a $3^{rd}$ Generation Partnership Project (3GPP) Long Term Evolution (LTE) system.

FIG. 2 is a view illustrating the structure of a radio frame in a 3GPP LTE system.

Referring to FIG. 2, a UL/DL data packet is transmitted in subframes, and one subframe is defined as a predetermined time period including a plurality of Orthogonal Frequency Division Multiplexing (OFDMA) symbols in a cellular OFDM wireless packet communication system.

One radio frame includes 10 subframes, each subframe including two slots in the time domain. A time required to transmit one subframe is defined as a Transmission Time Interval (TTI). For example, one subframe may be 1 ms long, and one slot may be 0.5 ms long. One slot may include a plurality of OFDM symbols in the time domain. Meanwhile, a TTI may refer to a time interval during which a coded packet is transmitted in a physical layer. Therefore, one or more contiguous subframes may be used to transmit a data packet. Since the 3GPP LTE system uses OFDMA in DL and SC-FDMA in UL, the OFDM symbol represents one symbol period. One symbol may be referred to as an SC-FDMA symbol or symbol interval in UL. A Resource Block (RB) is a resource allocation unit including a plurality of contiguous subcarriers in one slot. The structure of the radio frame is merely exemplary. Therefore, the number of subframes in a radio frame, the number of slots in a subframe, or the number of symbols in a slot may vary.

Figure 3:
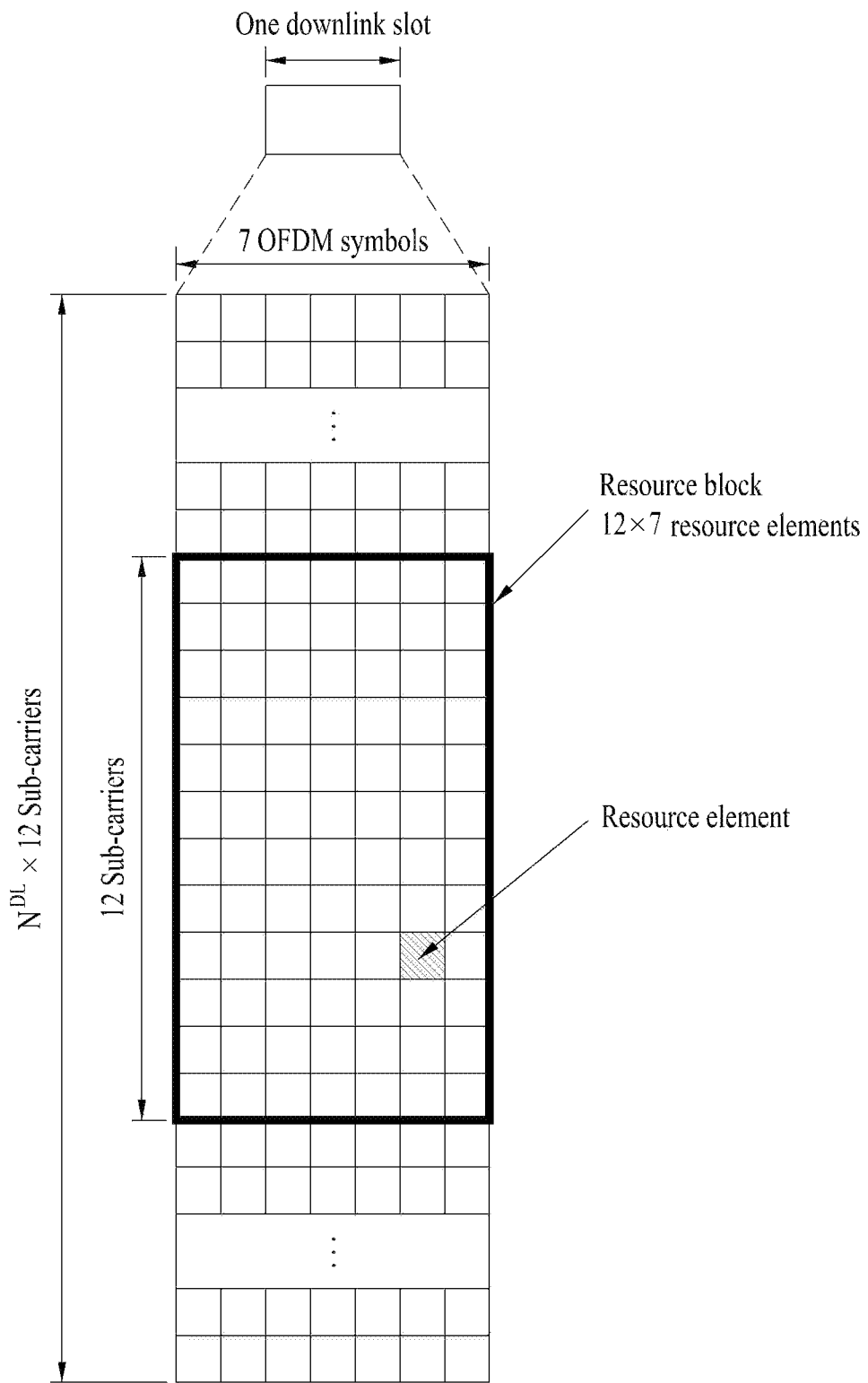
FIG. 3 is a view illustrating a resource grid of a downlink slot.

FIG. 3 is a view illustrating a resource grid for the duration of a DL slot. Referring to FIG. 3, one DL slot includes 7 OFDM symbols in the time domain, and one RB includes 12 subcarriers in the frequency domain, to which the present disclosure is not limited. For instance, in a normal Cyclic Prefix (CP) case, one slot may include 7 OFDM symbols, whereas in an extended CP case, one slot may include 6 OFDM symbols. Each element on a resource grid is called a Resource Element (RE). One RB includes 12×7 REs. The number $N^{DL}$ of RBs in a DL slot may depend on a DL transmission bandwidth. The structure of a UL slot may be identical to that of a DL slot.

Figure 4:
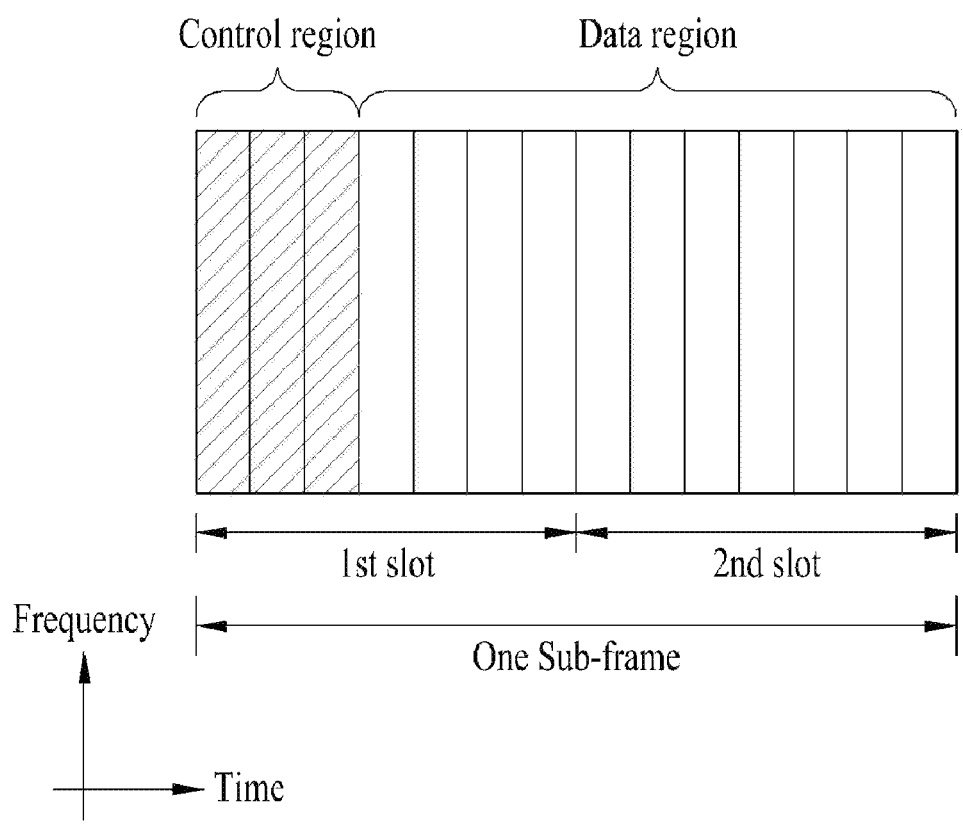
FIG. 4 is a view illustrating the structure of a downlink subframe.

FIG. 4 is a view illustrating the structure of a DL subframe. Up to three first OFDM symbols of the first slot of one subframe correspond to a control region to which control channels are allocated. The remaining OFDM symbols correspond to a data region to which a Physical Downlink Shared Channel (PDSCH) is allocated. Examples of DL control channels in the 3GPP LTE system include Physical Control Format Indicator Channel (PCFICH), Physical Downlink Control Channel (PDCCH), Physical hybrid automatic repeat request indicator Channel (PHICH), and so on. The PCFICH is transmitted in the first OFDM symbol of a subframe, carrying information about the number of OFDM symbols used for transmission of control channels in the subframe. The PHICH is a response channel for a UL transmission, including an Acknowledgment/Negative Acknowledgment (ACK/NACK) signal. The PDCCH delivers Downlink Control Information (DCI). The DCI includes UL or DL scheduling information or a UL transmit power control command for any UE group. The PDCCH carries a transmission format and resource allocation information for a Downlink Shared Channel (DL-SCH), a transmission format and resource allocation information for an Uplink Shared Channel (UL-SCH), paging information on a Paging Channel (PCH). system information on the DL-SCH, resource allocation information of a higher-layer control message such as a random access response transmitted on the PDSCH, a transmit power control command set for individual UEs in a UE group, transmission power control information, activation information for Voice over Internet Protocol (VoIP), and so on. A plurality of PDCCHs may be transmitted in the control region. A UE may monitor a plurality of PDCCHs. The PDCCH is transmitted in an aggregate of one or more contiguous Control Channel Elements (CCEs). A CCE is a logical allocation unit used to provide a PDCCH at a coding rate based on a radio channel state. The CCE corresponds to a plurality of Resource Element Groups (REGs). A PDCCH format and the number of available bits are determined according to the correlation between the number of CCEs and a coding rate provided by the CCEs. The number of CCEs used to transmit a PDCCH is referred to as a CCE aggregation level. Further, a CCE aggregation level is a CCE unit for detecting a PDCCH. The CCE aggregation level is defined as the number of contiguous CCEs. For example, the CCE aggregation level may be 1, 2, 4, or 8.

A BS determines a PDCCH format according to DCI to be transmitted to a UE, and attaches a Cyclic Redundancy Check (CRC) to control information. The CRC is masked by an Identifier (ID) (e.g. Radio Network Temporary Identifier (RNTI)) according to the owner or usage of the PDCCH. For example, if the PDCCH is directed to a specific UE, the CRC may be masked by a cell-RNTI (C-RNTI) of the UE. If the PDCCH is for a paging message, the CRC may be masked by a paging indicator identifier (P-RNTI). If the PDCCH is for system information (more specifically, a System Information Block (SIB)), the CRC may be masked by a System Information RNTI (SI-RNTI). If the PDCCH is for a random access response transmitted in response to a random access preamble, the CRC may be masked by a Random Access RNTI (RA-RNTI).

Figure 5:
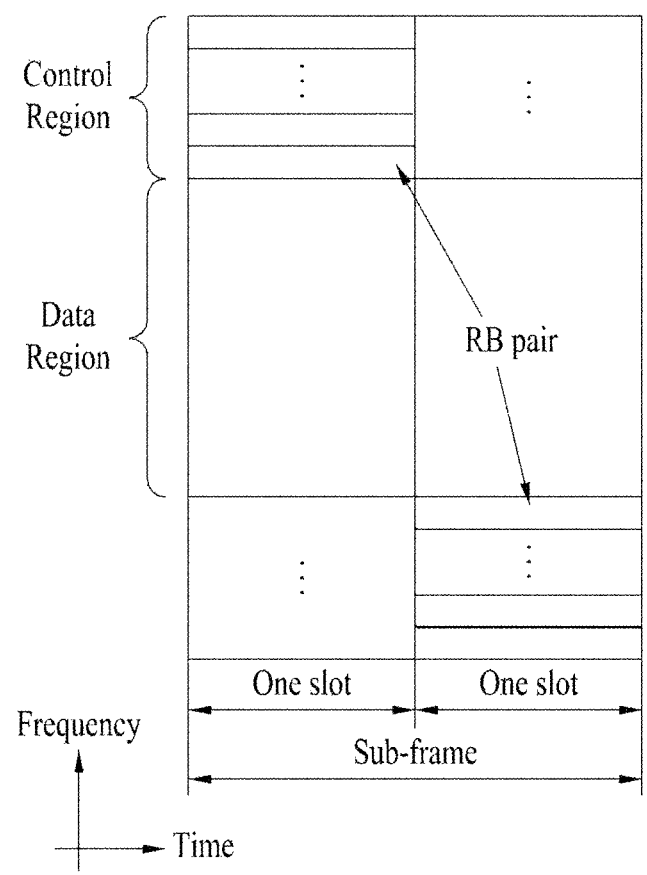
FIG. 5 is a view illustrating the structure of an uplink subframe.

FIG. 5 is a view illustrating the structure of a UL subframe. A UL subframe may be divided into a control region and a data region in the frequency domain. A Physical Uplink Control Channel (PUCCH) carrying Uplink Control Information (UCI) is allocated to the control region. A Physical Uplink Shared Channel (PUSCH) carrying user data is allocated to the data region. To maintain a single carrier property, a UE does not simultaneously transmit a PUSCH and a PUCCH. A PUCCH for a UE is allocated to an RB pair in a subframe. The RBs of the RB pair occupy different subcarriers in two slots. Thus, it is said that the RB pair allocated to the PUCCH is frequency-hopped over a slot boundary.

Modeling of Multiple Input Multiple Output (MIMO) System

Figure 6:
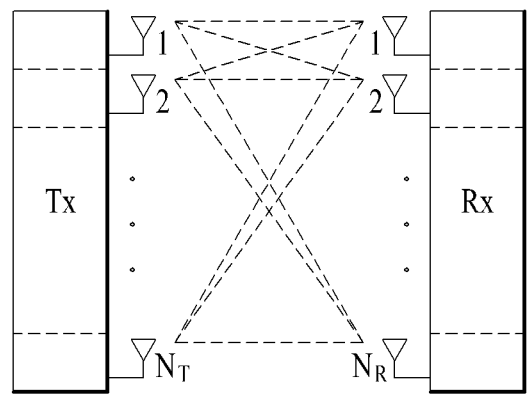
FIG. 6 is a view illustrating the configuration of a Multiple Input Multiple Output (MIMO) wireless communication system.
Figure 6:
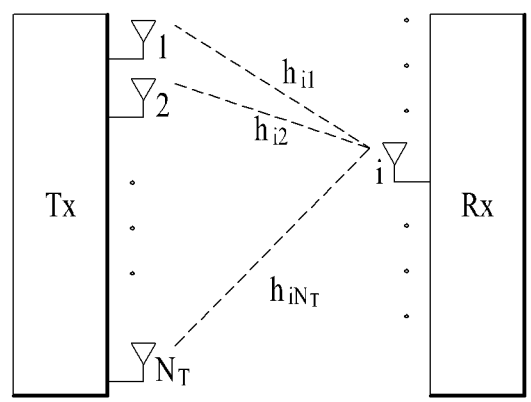

FIG. 6 is a view illustrating the configuration of a MIMO wireless communication system.

Referring to FIG. 6(a), when the number of Transmission (Tx) antennas and the number of Reception (Rx) antennas are increased to $N_T$ and $N_R$, respectively at both a transmitter and a receiver, a theoretical channel transmission capacity increases in proportion to the number of antennas, compared to the use of a plurality of antennas at only one of the transmitter and the receiver. Therefore, transmission rate and frequency efficiency are remarkably increased. Along with the increase of channel transmission capacity, the transmission rate may be increased in theory to the product of a maximum transmission rate $R_o$ that may be achieved with a single antenna and a rate increase rate $R_i$.

$$R_i = \min(N_T, N_R) \quad \text{[Equation 1]}$$

For instance, a MIMO communication system with four Tx antennas and four Rx antennas may achieve a four-fold increase in transmission rate theoretically, relative to a single-antenna system. Since the theoretical capacity increase of the MIMO wireless communication system was verified in the middle 1990s, many techniques have been actively developed to increase data rate in real implementation. Some of the techniques have already been reflected in various wireless communication standards including standards for 3G mobile communications, future-generation Wireless Local Area Network (WLAN), etc.

Concerning the research trend of MIMO up to now, active studies are underway in many respects of MIMO, inclusive of studies of information theory related to calculation of multi-antenna communication capacity in diverse channel environments and multiple access environments, studies of measuring MIMO radio channels and MIMO modeling, studies of time-space signal processing techniques to increase transmission reliability and transmission rate, etc.

A communication method in a MIMO system will be described in greater detail, using mathematical modeling. It is assumed that there are $N_T$ Tx antennas and $N_R$ Rx antennas in the system.

Regarding a transmission signal, up to $N_T$ pieces of information can be transmitted through the $N_T$ Tx antennas, as expressed as the following equation.

$$s = [s_1, s_2, \ldots, s_{N_T}]^T \quad \text{[Equation 2]}$$

A different transmission power may be applied to each piece of transmission information, $s_1, s_2, \ldots, s_{N_T}$. Let the transmission power levels of the transmission information be denoted by $P_1, P_2, \ldots, P_{N_T}$, respectively. Then the transmission power-controlled transmission information may be given as $$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

The transmission power-controlled transmission information $\hat{s}$ may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

$N_T$ transmission signals $x_1, x_2, \ldots, x_{N_T}$ may be generated by multiplying the transmission power-controlled information vector $\hat{s}$ by a weight matrix W. The weight matrix W functions to appropriately distribute the transmission information to the Tx antennas according to transmission channel states, etc. These $N_T$ transmission signals $x_1, x_2, \ldots, x_{N_T}$ are represented as a vector x, which may be determined by $$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

Here, $w_{ij}$ denotes a weight between a $j^{th}$ piece of information and an $i^{th}$ Tx antenna. W is also called a weight matrix or a precoding matrix.

Given $N_R$ Rx antennas, signals received at the Rx antennas, $y_1, y_2, \ldots, y_{N_R}$ may be represented as the following vector.

$$y = [y_1, y_2, \ldots, y_{N_R}]^T \qquad \text{[Equation 6]}$$

When channels are modeled in the MIMO wireless communication system, they may be distinguished according to the indexes of Tx and Rx antennas. A channel between a $j^{th}$ Tx antenna and an $i^{th}$ Rx antenna is denoted by $h_{ij}$. One thing to note herein is that the index of an Rx antenna precedes the index of a Tx antenna in $h_{ij}$.

FIG. 6(b) illustrates channels from $N_T$ Tx antennas to an $i^{th}$ Rx antenna. The channels may be collectively represented as a vector or a matrix. Referring to FIG. 6(b), the channels from the $N_T$ Tx antennas to the $i^{th}$ Rx antenna may be expressed as [Equation 7].

$$h_i^T = [h_{i1}, h_{i2}, \ldots, h_{iN_T}] \qquad \text{[Equation 7]}$$

Hence, all channels from the $N_T$ Tx antennas to the $N_R$ Rx antennas may be expressed as the following matrix.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \qquad \text{[Equation 8]}$$

Actual channels experience the above channel matrix H and then are added with Additive White Gaussian Noise (AWGN). The AWGN $n_1, n_2, \ldots, n_{N_R}$ added to the $N_R$ Rx antennas is given as the following vector.

$$n = [n_1, n_2, \ldots, n_{N_R}]^T \qquad \text{[Equation 9]}$$

From the above mathematical modeling, the received signal is given as $$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n \qquad \text{[Equation 10]}$$

The numbers of rows and columns in the channel matrix H representing channel states are determined according to the numbers of Rx and Tx antennas. Specifically, the number of rows in the channel matrix H is equal to the number of Rx antennas, $N_R$ and the number of columns in the channel matrix H is equal to the number of Tx antennas, $N_T$. Hence, the channel matrix H is an $N_R \times N_T$ matrix.

The rank of a matrix is defined as the smaller between the number of independent rows and the number of independent columns in the matrix. Accordingly, the rank of the matrix is not larger than the number of rows or columns of the matrix. The rank of the channel matrix H, rank(H) satisfies the following constraint.

$$\text{rank}(H) \leq \min(N_T, N_R) \qquad \text{[Equation 11]}$$

The rank of a matrix may also be defined as the number of non-zero eigenvalues, when the matrix is decomposed by EigenValue Decomposition (EVD). Similarly, the rank of a matrix may be defined as the number of non-zero singular values, when the matrix is decomposed by Singular Value Decomposition (SVD). Therefore, the rank of a channel matrix may be the maximum number of different pieces of information that can be transmitted on a physical channel, in its physical meaning.

Multi-User (MU)-MIMO Operation

MU-MIMO is an operation of simultaneously serving a plurality of users (UEs) by a BS with multiple antennas. If a plurality of users are served by a single BS, a signal for one UE may interfere with another UE, thereby decreasing overall system performance. Therefore, interference between users should be cancelled for successful data transmission and reception during an MU-MIMO operation. For this purpose, the BS may process signals to be transmitted to multiple users according to an interference cancellation scheme.

The BS may encode an information block to be transmitted to each UE to an independent codeword. The codewords may be transmitted according to the interference cancellation scheme. For example, the BS may cancel interference in advance for codewords to be transmitted to a plurality of UEs. Since a signal transmitted to one UE, $U_1$ is pre-subtracted from a signal transmitted to another UE, $U_2$, the UE $U_2$ may receive the signal from the BS as if there were no interference, which obviates the need for an additional interference cancellation operation. Zero Forcing-Dirty Paper Coding (ZF-DPC), Zero Forcing (ZF), or the like is available as the interference cancellation scheme.

In regards to ZF-DPC, if one BS simultaneously serves two UEs, $U_1$ and $U_2$, a composite channel of a channel $h_1$ of the UE $U_1$ and a channel $h_2$ of the UE $U_2$ may be given as $H = [h_1 \; h_2]$. The composite channel H may be LQ-decomposed into a lower triangular matrix L and an orthogonal matrix Q, as expressed as [Equation 12].

$$H = LQ = \begin{bmatrix} l_{11} & 0 \\ l_{21} & l_{22} \end{bmatrix} \begin{bmatrix} q_{11} & q_{12} \\ q_{21} & q_{22} \end{bmatrix} \qquad \text{[Equation 12]}$$

If a MIMO transmission is performed using the columns of the matrix Q as a beamforming vector in [Equation 12], only the lower triangular matrix L remains in a signal received by a UE. If the BS has full knowledge of a channel environment in which each UE is placed, an interference-free encoded component in the first row may be transmitted without interference components of the second row. If $w_i = q_i$ for a beamforming vector $w_i$ for each UE (i.e., a beamforming vector for the UE $U_1$ is $w_1$, and a beamforming vector for the UE $U_2$ is $w_2$), an effective channel may be represented as [Equation 14]. Therefore, since a signal for one UE may be transmitted by canceling interference from a signal for another UE in advance, the UE may receive the signal successfully from the BS without an additional interference cancellation operation.

$$h_i w_k = \begin{cases} l_{ii} & i = k \\ 0 & i \neq k \end{cases} \quad \text{[Equation 13]}$$

In regards to ZF beamforming, interference may be cancelled through pseudo-inversion of the composite channel H for multiple users, as described by [Equation 15].

$$F = H^H (H H^H)^{-1} \quad \text{[Equation 14]}$$

In [Equation 15], $X^H$ represents the Hermitian matrix of a matrix X, and $X^{-1}$ represents the inverse matrix of the matrix X. Each column of a matrix F in [Equation 14] is a beamforming vector for a UE. That is, $w_i = f_i$. In this case, an effective channel for each UE may be represented as [Equation 15].

$$h_i w_k = \begin{cases} \dfrac{1}{\|w_i\|} & i = k \\ 0 & i \neq k \end{cases} \quad \text{[Equation 15]}$$

In this ZF scheme, since channels for each UE take the form of an identity matrix, the UE may receive a signal from which interference is preliminarily cancelled.

Relay

Deployment of relays may be considered, for example, to extend high-rate coverage, increase group mobility, deploy a temporary network, increase a cell-edge throughput, and/or provide network coverage to a new area.

Referring to FIG. 1 again, the RN 120 functions to forward signals between the eNodeB 110 and the UE 142, and two types of links (backhaul and access links) having different characteristics are applied to each carrier frequency band. The eNodeB 110 may include a donor cell. The RN 120 may be connected wirelessly to a radio access network through the donor cell 110.

If the backhaul link between the eNodeB 110 and the RN 120 uses a DL frequency band or DL subframe resources, the backhaul link may be called a backhaul DL, and if the backhaul link between the eNodeB 110 and the RN 120 uses a UL frequency band or UL subframe resources, the backhaul link may be called a backhaul UL. Herein, a frequency band is resources allocated in Frequency Division Duplex (FDD) mode, and a subframe is resources allocated in Time Division Duplex (TDD) mode. Similarly, if the access link between the RN 120 and the UE 142 uses a DL frequency band or DL subframe resources, the access link may be called an access DL, and if the access link between the RN 120 and the UE 142 uses a UL frequency band or UL subframe resources, the access link may be called an access UL. FIG. 1 illustrates a backhaul UL/DL configuration and an access UL/DL configuration for an FDD-mode RN.

A BS is required to have UL reception and DL transmission functions, whereas a UE is required to have UL transmission and DL reception functions. Meanwhile, an RN is required to have all of the functions of backhaul UL transmission to a BS, access UL reception from a UE, backhaul DL reception from a BS, and access DL transmission to a UE.

With respect to use of a frequency band (or spectrum) for an RN, the RN's operation may be classified into in-band and out-band. For an 'in-band' RN, a backhaul link shares the same frequency band with an access link. If the backhaul link and the access link operate in different frequency bands, the RN is an 'out-band' RN. In both in-band and out-band relaying, a UE operating in a legacy LTE system (e.g., a UE conforming to Release-8) should be able to access a donor cell.

Depending on whether a UE is aware of the existence of RNs, RNs may be classified into a transparent RN and a non-transparent RN. If the UE does not perceive whether it communicates with a network via an RN, the RN is a transparent RN. In contrast, if the UE perceives whether it communicates with a network via an RN, the RN is a non-transparent RN.

In relation to control of RNs, RNs may be classified into an RN configured as a part of a donor cell and an RN that autonomously controls a cell.

The former RN may have an RN ID, although it does not have its own cell ID. If at least a part of Radio Resource Management (RRM) of an RN is controlled by an eNB covering the donor cell, the RN is regarded as configured as a part of the donor cell (even though the other parts of the RRM reside in the RN). Preferably, this RN is capable of supporting legacy UEs. For instance, smart repeaters, decode-and-forward relays, Layer 2 (L2) relays, and Type-2 relays are this type of RNs.

The latter RN controls one or more cells. The cells are allocated their unique physical cell IDs and they may use the same RRM mechanism. From the viewpoint of a UE, there is no distinction between accessing a cell controlled by an RN and accessing a cell controlled by a general eNB. Preferably, a cell controlled by this type of RN may support legacy UEs. For example, RNs of this type include self-backhauling RNs, Layer 3 (L3) relays, Type-1 relays, and Type-1a relays.

A Type-1 relay is an in-band RN that controls a plurality of cells. Each of the plurality of cells appears to a UE as a separate cell distinct from a donor cell. The plurality of cells have their own physical cell IDs (as defined in LTE Release-8), and the RN may transmit its own synchronization channels, Reference Signals (RSs), etc. During a single-cell operation, a UE may receive scheduling information and a Hybrid Automatic Repeat reQuest (HARQ) feedback directly from the RN and transmit its control channels (a Scheduling Request (SR), a Channel Quality Indicator (CQI), an ACK/NACK, etc.) to the RN. The Type-1 relay appears as a legacy eNB (operating in conformance to LTE Release-8) to a legacy UE (conforming to LTE Release-8). That is, the Type-1 relay has backward compatibility. On the other hand, to LTE-A UEs, the Type-1 relay appears to be different from a legacy eNB. Thus the Type-1 relay may improve performance.

Except for its out-band operation, a Type-1a relay is characterized by the same set of features as the Type-1 relay. The Type-1a relay may be configured such that the influence of its operation on an L1 operation may be minimized or eliminated.

A Type-2 relay is an in-band RN that does not have its own physical cell ID and thus does not form a new cell. Since the Type-2 relay is transparent to legacy UEs, the legacy UEs do not notice the existence of the Type-2 relay. The Type-2 relay may transmit a PDCCH but does not transmit at least a Common Reference Signal (CRS) and a PDCCH.

HARQ Operation

To control data reception failure, the following HARQ operation may be performed. After transmitting a packet, upon receipt of an ACK signal from a data receiver, a data transmitter may transmit a new packet, and upon receipt of a NACK signal from the data receiver, the data transmitter may retransmit the already-transmitted packet. Herein, the retransmission packet may be a packet encoded by Forward Error Correction (FEC). Therefore, the data receiver receives the packet and decodes the received packet. If the decoding is successful, the data receiver transmits an ACK signal, and if the decoding is failed, the data receiver transmits a NACK signal and stores the received packet in a buffer. Upon receipt of a retransmission packet in response to the NACK signal, the data receiver combines the retransmission packet with the packet stored in the buffer and decodes the combined packet, thereby increasing the reception success rate of packets.

HARQ schemes may be classified into synchronous HARQ and asynchronous HARQ depending on their retransmission timings. In synchronous HARQ, if an initial transmission is failed, a subsequent retransmission is performed at a time determined by the system. For example, if it is configured that a retransmission takes place in every fourth time unit (e.g., subframe) after an initial transmission failure, there is no need for additionally indicating a retransmission time to the receiver. Therefore, if the data transmitter receives a NACK signal, the data transmitter retransmits a packet in every fourth time unit until receiving an ACK signal. On the other hand, in asynchronous HARQ, a retransmission time is scheduled separately. Accordingly, a retransmission time of a packet corresponding to a NACK signal may be changed according to various factors such as a channel state.

Further, HARQ schemes may be classified into adaptive HARQ and non-adaptive HARQ depending on whether the amount of resources used for a retransmission reflects a channel state. In non-adaptive HARQ, a packet is retransmitted according to an MCS level, the number of RBs, and so on which have been determined for an initial transmission of the packet. For example, if the transmitter initially transmits data in 8 RBs, the transmitter also retransmits the data in 8 RBs. On the other hand, in adaptive HARQ, the modulation scheme of a packet, the number of RBs used for the packet, and so on are changed according to a channel state. For example, even though an initial transmission packet is transmitted in 8 RBs, the packet may be retransmitted in more or fewer RBs than 8 RBs according to a channel state.

In the afore-described HARQ data packet transmission operation, the transmitter may perform an initial transmission and retransmissions in sub-packets by converting a data packet into sub-packets each having a predetermined size.

A plurality of sub-packets used for an initial transmission and retransmissions in HARQ are generated from one codeword packet. The plurality of sub-packets may be distinguished by their lengths and starting positions. These distinguishable sub-packets are called Redundancy Versions (RVs). For example, an HARQ operation may be performed by receiving as many sub-packets as the difference between total codeword packets to be received and already-received sub-packets, and decoding the packets. This may be referred to as an Incremental Redundancy (IR) HARQ operation.

Transmission of Partial Signal through Relay in MU Environment

Figure 7:
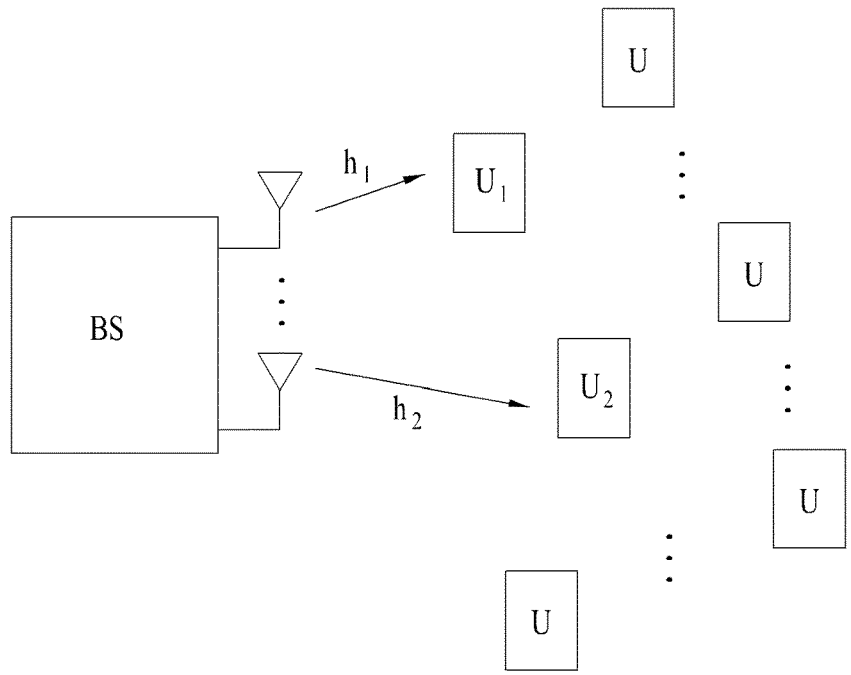
FIG. 7 is a view illustrating the concept of a Multi-User (MU) environment.
Figure 7:
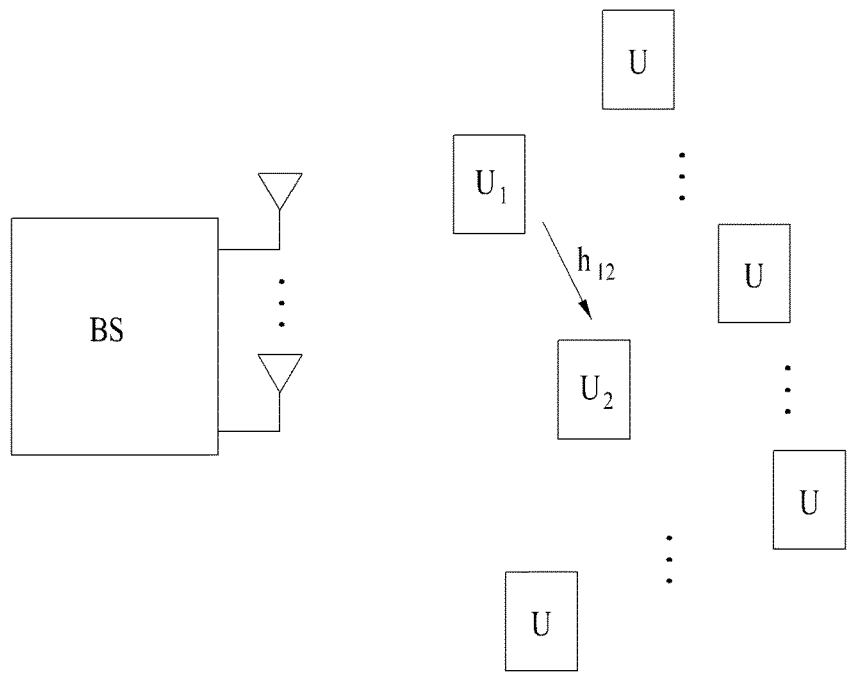

FIG. 7 is a view illustrating the concept of an MU environment. The example of FIG. 7 is based on the assumption that a BS has multiple antennas and is capable of supporting MU-MIMO transmission, and each of UEs, $U_1$, $U_2$, . . . has a single antenna. However, the assumption is merely exemplary for clarity of description, and the principle of the present disclosure as described below is applicable to a UE(s) having multiple antennas.

Referring to FIG. 7(a), a plurality of UEs $U_1$, $U_2$, . . . may receive signals simultaneously from a BS. Let a channel to the UE, $U_1$ be denoted by $h_2$ and a channel to the UE, $U_2$ be denoted by $h_2$. It is assumed that the UE, $U_1$ is near to the BS and thus is in a good channel state, whereas the UE, $U_2$ is located at a cell edge relatively to the UE, $U_1$ and thus is in a poor channel state. Although the BS may transmit a signal with high power to the UE in the poor channel state to ensure data transmission to the UE, interference may occur. To solve the problem, various types of RNs as described before may be introduced. However, since deployment of new RNs in a network requires additional resources, a method for enabling a UE in a good channel state among a plurality of UEs to function as an RN may be considered. This RN may be referred to as a UE-relay. That is, the UE-relay is transparent to a UE that receives data.

In FIG. 7(b), the UE, $U_1$ functions as a UE-relay, and the UE, $U_2$ receives data from the BS through the UE, $U_1$. As data transmission is performed through cooperation between UEs in an MU environment in this manner, total transmission capacity and resource use efficiency may be increased. For example, the UE $UE_1$ in the good channel state with the BS relative to other UEs may function as a UE-relay and help data transmission to another UE, $UE_2$ in the poor channel state. Specifically, the UE, $U_1$ may receive data directed to the UE, $UE_1$ and data directed to the UE, $U_2$, simultaneously from the BS. The UE, $U_1$ may forward the data for the UE, $U_2$ to the UE, $U_2$ out of the received data. The UE, $U_2$ may acquire its data from data received directly from the BS and the data received from the UE, $UE_1$. This data transmission scheme may be referred to as a partial signal transmission scheme.

Figure 8:
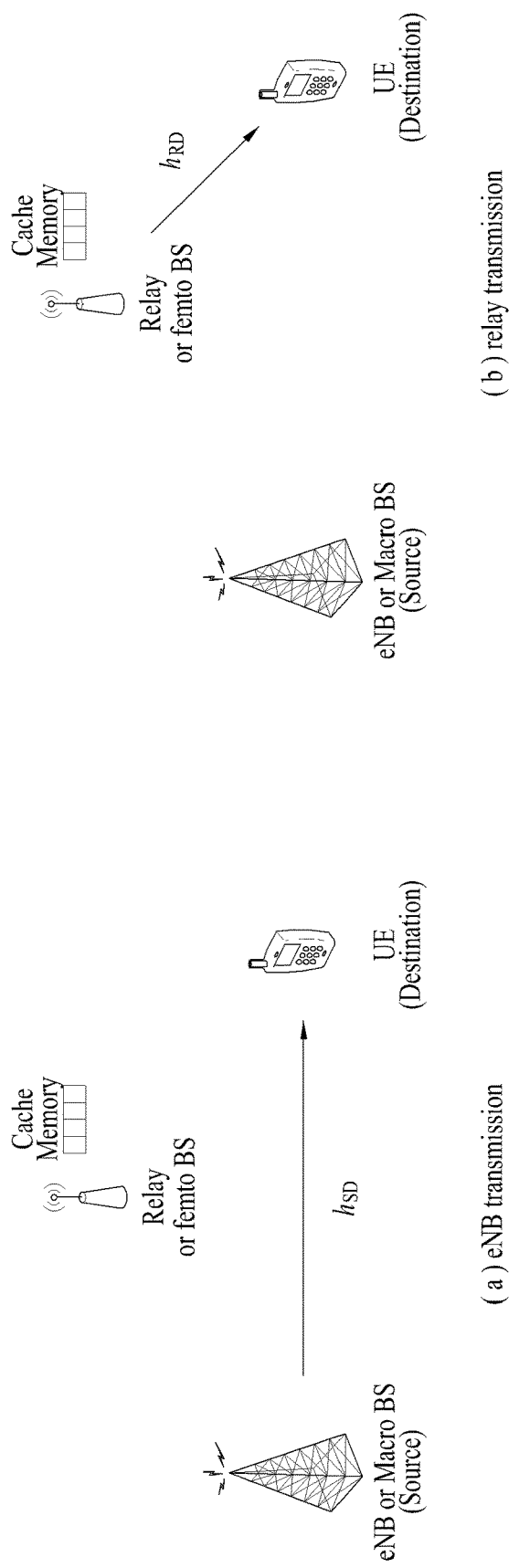
FIG. 8 is a view illustrating an exemplary communication system applicable to the present disclosure.

FIG. 8 is a view illustrating an exemplary communication system applicable to the present disclosure.

Referring to FIG. 8, a BS may service content to a user on DL directly or indirectly through an RN. Under circumstances, the BS may be a BS of a macro cell, and the RN may be a small BS of a femto cell or pico cell. Or the RN may be a UE-relay as described with reference to FIG. 7.

Although content serviced to a user may include various types of files, an embodiment of the present disclosure will be described below in the context of video content which is frequently used among UE-requested data in a current mobile communication system, by way of example. One video file may be a set of a plurality of frames. Because the frames of the video content differ in the amount of image information or entropy, it is typical to encode each frame to a different number of bits. It is assumed that a general video content compression scheme, variable bit rate coding is used. Each encoded frame is divided into packets of the same size, for transmission to a user on a radio communication channel, and then sequentially transmitted.

Meanwhile, content may be transmitted to a UE in a scheme in which an RN or a proxy pre-stores a part of the user-requested content in a cache memory. The use of a cache memory is called caching.

Conventional caching-based content transmission is performed using prefix caching in which a starting part of UE-requested content is pre-stored in a cache memory by an RN or a proxy. In general, an average channel between an RN and a UE is better than an average channel between a BS and the UE. Accordingly, as the RN pre-stores a starting part of content, the RN may transmit the stored part to the UE on behalf of the BS.

When the user requests transmission of the content stored in the cache memory, the RN transmits the starting part of the content that it has to the user on behalf of the BS. If there is no more content to be transmitted to the user and thus the transmission is completed, the BS transmits, to the user, the remaining part of the content except the content transmitted by the RN.

Referring to FIG. 8, an RN pre-stores a starting part of content in a cache memory. Upon receipt of a request from a UE, the RN transmits the part of the content to the UE on a relay-to-destination channel, $h_{RD}$ established between the RN and the UE. If the RN has no more content for the UE and thus completes the transmission, a BS (source) transmits to the UE the remaining part of the content except the content transmitted by the RN to the UE on a source-to-destination channel, $h_{SD}$ established between the BS and the UE.

However, the conventional prefix caching-based content transmission scheme gives no regard to an RN's capability of overhearing content, when a BS transmits the content to a UE. Therefore, the RN transmits only a pre-stored starting part of the content to the UE on behalf of the BS, and the BS transmits to the UE the remaining part of the content which is not stored in a cache memory of the RN, without additional assistance of the RN. However, since a signal may be broadcast in all directions in a mobile communication environment, when the BS transmits UE-desired content, the RN may recover the content by overhearing the content, combine the recovered content with content that the RN already has, and transmit the combined content more efficiently to the UE. However, the conventional caching-based transmission scheme does not consider the broadcast property of a signal, thus having limitations in efficiently utilizing an RN.

Now, the present disclosure proposes a method of an RN for increasing quality of user experience by using a cache memory in an environment in which a BS transmits user-requested content to a user on DL.

Figure 9:
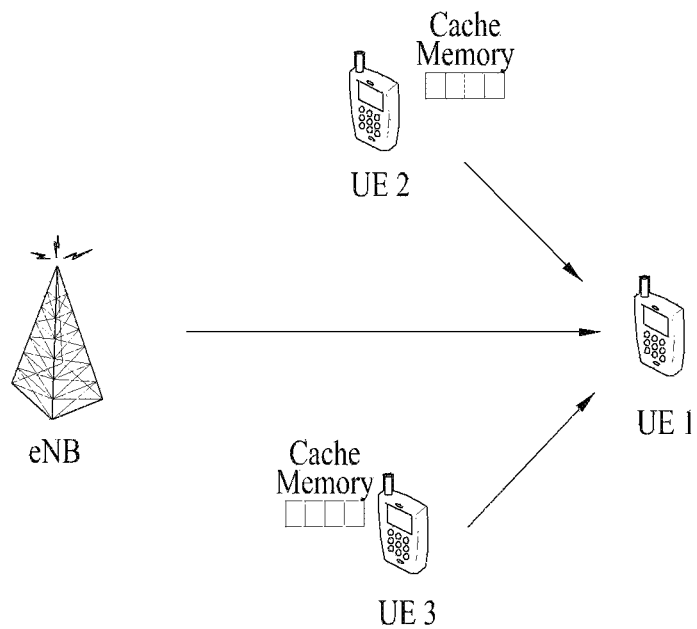
FIG. 9 is a view illustrating a method for transmitting content by caching according to an embodiment of the present disclosure.

FIG. 9 is a view illustrating a method for transmitting content by caching according to an embodiment of the present disclosure.

FIG. 9 will be described on the assumption that an RN is a UE-relay. UEs serving as UE-relays are denoted by UE2 and U3, and a destination UE for receiving content is denoted by UE1.

Referring to FIG. 9, UE2 recovers content from a part of the content, stored in a cache memory and an overheard signal transmitted from a BS to UE1 on a channel $h_{SD}$. UE2 combines a part of the content recovered from the overheard signal with the part of the content pre-stored in the cache memory, and transmits the combined content to UE1 on a channel $h_{RD}$. Upon receipt of the combined content, UE1 may recover its requested content from the signals received from the BS and UE2. According to the present disclosure, an RN may design a scheme of selecting content to be stored in its cache memory to increase the quality of content experienced by a user, and a transmission scheme of combining content stored in a cache memory with content recovered from a signal of a BS.

Figure 10:
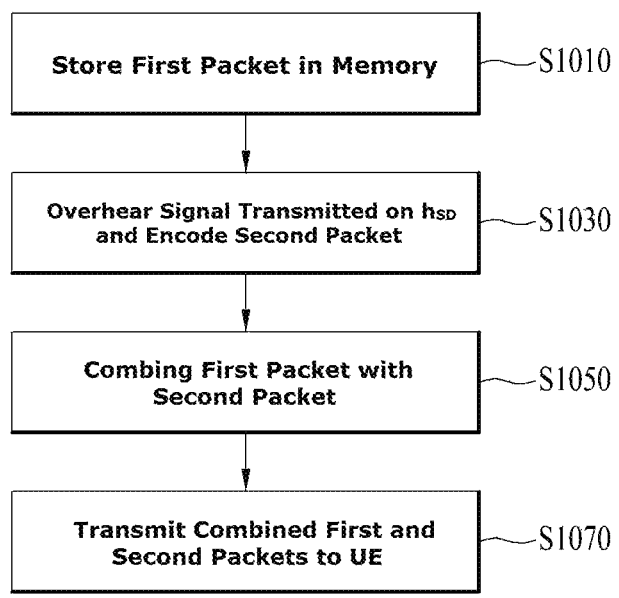
FIG. 10 is a flowchart illustrating a method for transmitting content according to the present disclosure.

FIG. 10 is a flowchart illustrating a content transmission method according to the present disclosure.

Referring to FIG. 10, an RN stores a first packet in a cache memory by caching in step S910. Subsequently, the RN exchanges information about the cached content with a BS as a procedure of preparing for content transmission. In step S5930, the RN overhears content that the BS transmits to a UE on a channel $h_{SD}$. In this case, the RN attempts to decode a second packet other than the packet pre-stored in the cache memory. If the RN succeeds in decoding the second packet, the RN combines the first packet with the second packet in step S950, and transmits the combined first and second packets to a receiving UE in step S970.

Figure 11:
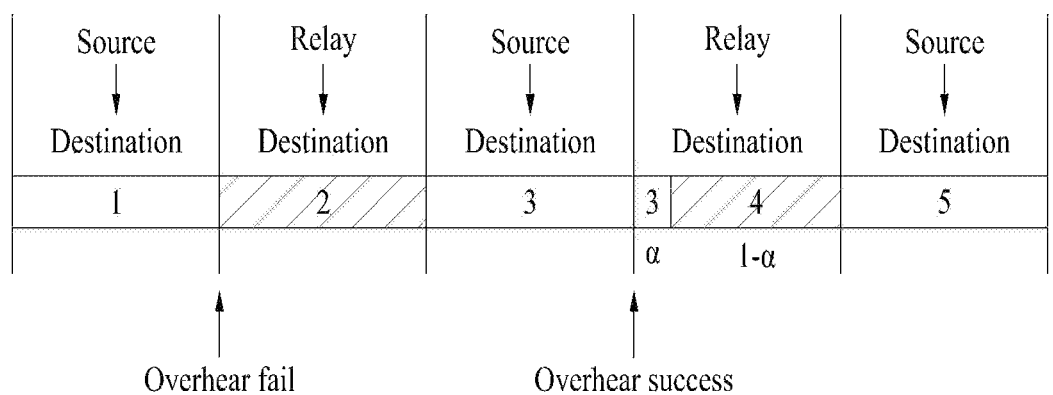
FIG. 11 is a view illustrating a caching scheme and a caching-based transmission scheme according to an embodiment of the present disclosure.

A caching scheme for effectively utilizing the afore-described signal overhearing and a caching-based transmission scheme will be described in greater detail with reference to FIG. 11. While it is assumed in FIG. 11 that one frame includes 5 packets in total, the frame may include fewer or more packets than 5 packets.

To utilize signal overhearing, caching may be performed in such a manner that non-stored packets may be positioned uniformly between packets stored in a cache memory, as a caching example. For example, even-numbered packets at even-numbered positions may be stored, as illustrated in FIG. 11. Referring to FIG. 11, packets at second and fourth positions, that is, even-numbered positions are stored in the cache memory.

In the case where the RN transmits content to the UE based on the above caching, since odd-numbered packets (packet 1, packet 3, and packet 5) are not stored in the RN, the BS transmits the odd-numbered packets to the UE, and the RN transmits the even-numbered packets to the UE. According to the above-described present disclosure, when the BS transmits the odd-numbered packets, the RN overhears the odd-numbered packets to decode data.

If the RN succeeds in decoding the signal, the RN combines the even-numbered packets with a successfully decoded odd-numbered packet and transmits the combined packets to the UE. Thus, the RN may help the UE to decode the odd-numbered packets to be received from the BS. Referring to FIG. 11, since the RN fails in overhearing packet 1, the RN transmits packet 2 without combining it with packet 1. On the other hand, the RN succeeds in overhearing packet 3 and thus transmits packet 3 and packet 4 in combination. Herein, α is a parameter for adjusting combining. To combine two pieces of content, superposition coding-based combining, orthogonal time division-based combining, or the like is available. The combined packets may be transmitted in resources configured for the even-numbered packet, packet 4. That is, packet 3 and packet 4 may be transmitted together in the resources allocated to packet 4. In this manner, a user may receive video content more efficiently, and thus feel improved quality of experience for the content.

Now, a detailed description will be given of a caching step, a content transmission preparation step for exchanging information about content, and a content transmission step, as a procedure for performing each step.

<Caching Step>

A procedure of storing a first packet in a cache memory is called a caching step. In the caching step, the RN makes a list of content which is highly likely to be requested frequently by accumulating user-desired content over a long term. The list may be made statistically or in any other method. The RN may store only a part of popular content of the list in the cache memory in view of a limited storage capacity of the cache memory. Therefore, the RN selects packets that may exist at uniform positions from among the packets of frames of the content to be stored, and stores the selected packets in the cache memory.

The caching may be performed through wireless data transmission from the BS in a time period free of user requests, or by data sharing via a backhaul link, if the backhaul link has been established between the RN and the BS.

On the assumption that up to M packets in total may be stored per content due to the storage capacity of the cache memory, the number of packets to be stored for each frame in the cache memory may be determined in various manners. Herein, the number of packets to be stored among packets allocated to an $i^{th}$ frame is denoted by $X_i$.

For example, a general criterion for the quality of an image file, Peak Signal-to-Noise ratio (PSNR) may be used to determine $X_i$. A PSNR is determined according to an image or frame coding scheme, as given by the following equation.

$$PSNR_i = 10 \log_{10} \frac{MAX^2}{MSE_i} \qquad \text{[Equation 16]}$$

PSNR$_i$ represents the PSNR of the $i^{th}$ frame. MAX represents a maximum value representable per pixel, generally given as 255, and MSE represents a mean square error value. As the number of bits in a frame increases, the MSE decreases. If the thus-defined PSNR is used as a quality criterion, $X_i$ may be determined by solving an optimization problem such as [Equation 17].

$$P1: \max_{X_1,\ldots,X_F} \min_i (P_i^{succ} PSNR_i) \qquad \text{[Equation 17]}$$

subject to $$\sum_{i=1}^{F} X_i \le M,$$

$$X_i \in \{0, \ldots, N_i\}, \forall i.$$

In [Equation 17], $X_i$ represents the number of packets to be stored out of the packets of the $i^{th}$ frame, $P_i^{succ}$ represents a probability of successfully reproducing the $i^{th}$ frame, F represents the number of frames included in the content, M represents the number of packets to be stored in the cache memory, and Ni represents the number of packets required to transmit the $i^{th}$ frame. The above optimization problem is used to increase the quality of the worst frame. When needed, $X_i$ may be determined, taking into account an optimization problem for increasing the average quality of frames. In a more complex way, $X_i$ may be obtained by an integrated optimization problem along with the parameter $\alpha$ for adjusting combining between an overheard decoded odd-numbered packet and a stored even-numbered packet as described before.

<Content Transmission Preparation Step>

If the RN listens to information about user-requested content and has a part of the content, for example, a first packet in its cache memory, the RN transmits an ACK signal to the BS. The RN indicates the positions of stored packets of the content to the BS along with the ACK signal. This information is needed for the BS and the RN to transmit the content to the user through cooperation. If the RN does not have the user-requested content, the RN transmits a NACK signal to the BS.

<Content Transmission Step>

If the RN does not have the user-requested content, the BS receives the NACK signal from the RN in the afore-described content transmission preparation step. Then, only the BS transmits the content to the user.

On the contrary, if the RN has the user-requested content, the BS receives a signal carrying information indicating packets of the content that the RN has, along with the ACK signal. In this case, the BS transmits only a part of the content that the RN does not have, that is, only packet 2 in FIG. 10 based on the received information to the user.

When the BS transmits data to the user, the RN overhears the signal. A probability of the RN's succeeding in overhearing may be calculated by the following equation in a Rayleigh fading environment.

$$\epsilon^{overhear} = Pr[\log_2(1 + |h_{SR}|^2 \gamma_{SR}) < R] \qquad \text{[Equation 18]}$$

$$= 1 - \exp\left(-\frac{2^R - 1}{\gamma_{SR}}\right)$$

In [Equation 18], $\epsilon^{overhear}$ represents the probability of the RN's succeeding in overhearing, $h_{SR}$ represents short term fading between the BS and the RN, $\gamma_{SR}$ represents long term fading between the BS and the RN, and R represents a data transmission rate. On the assumption that the RN stores only even-numbered packets and the BS transmits odd-numbered packets to the UE, if the RN succeeds in overhearing an odd-numbered packet, the RN combines an even-numbered packet that it has with the successfully decoded odd-numbered packet and transmits the combined packets to the UE. For packet combining, superposition coding-based combining, orthogonal time division-based combining, or the like is available. These packets may be combined in various manners. If the packets are combined in time division, probabilities of the UE's failing in decoding an assisted odd-numbered packet and an assisting even-numbered packet may be given as [Equation 19] and [Equation 20], respectively.

$$\epsilon^{coop}(\alpha) = Pr[\log_2(1 + |h_{SD}|^2 \gamma_{SD}) + \qquad \text{[Equation 19]}$$

$$\alpha \log_2(1 + |h_{RD}|^2 \gamma_{RD}) < R]$$

$$= 1 - \exp\left(\frac{1 - 2^{R/\alpha}}{\gamma_{RD}}\right) - \int_0^{2^{R/\alpha}-1} \frac{1}{\gamma_{RD}}$$

$$\exp\left(-\frac{y}{\gamma_{RD}} - \frac{2^R - (1+y)^\alpha}{(1+y)^\alpha \gamma_{SD}}\right) dy$$

$$\epsilon^{RD,2}(\alpha) = Pr[(1-\alpha)\log_2(1 + |h_{RD}|^2 \gamma_{RD}) < R] \qquad \text{[Equation 20]}$$

$$= (1 - \exp\left(-\frac{2^{R/(1-\alpha)} - 1}{\gamma_{RD}}\right)$$

Herein, $\epsilon^{coop}(\alpha)$ represents a probability of failing in decoding the odd-numbered packet at the receiving UE, when the RN succeeds in overhearing, $h_{SD}$ represents short term fading between the BS and the receiving UE, $\gamma_{SD}$ represents long term fading between the BS and the receiving UE, $\alpha$ is a combining adjustment parameter representing a portion of a time taken for the RN to transmit the successfully decoded odd-numbered packet to the UE out of a total time period allocated to transmission of the even-numbered packet, $h_{RD}$ represents short term fading between the RN and the receiving UE, $\gamma_{RD}$ represents long term fading between the RN and the receiving UE, and R represents the amount of transmitted data.

Meanwhile, $\epsilon^{RD,2}(\alpha)$ represents a probability of failing in decoding the even-numbered packet at the receiving UE, when the RN succeeds in overhearing. Herein, in consideration of trade-off between the probability of failing in decoding the odd-numbered packet at the receiving UE and the probability of failing in decoding the even-numbered packet at the receiving UE, α may be determined in a manner that increases content quality.

If the RN fails in overhearing the signal transmitted by the BS, the RN transmits only the even-numbered packets that it has to the UE. The probabilities of failing in decoding the odd-numbered packet and the even-numbered packet by the receiving UE may be given by [Equation 21] and [Equation 22], respectively.

$$\epsilon^{SD} = Pr[\log_2(1 + |h_{SD}|^2 \gamma_{SD}) < R]$$
$$= 1 - \exp\left(-\frac{2^R - 1}{\gamma_{SD}}\right)$$ [Equation 21]

$$\epsilon^{RD,1} = Pr[\log_2(1 + |h_{RD}|^2 \gamma_{RD}) < R]$$
$$= (1 - \exp\left(-\frac{2^R - 1}{\gamma_{RD}}\right)$$ [Equation 22]

$\epsilon^{SD}$ represents a probability of failing in decoding the odd-numbered packet at the receiving UE, when the RN fails in overhearing, $h_{SD}$ represents short term fading between the BS and the receiving UE, $\gamma_{SD}$ represents long term fading between the BS and the receiving UE.

Meanwhile, $\epsilon^{SD,1}$ represents a probability of failing in decoding the odd-numbered packet at the receiving UE, when the RN fails in overhearing, $h_{RD}$ represents short term fading between the RN and the receiving UE, and $\gamma_{RD}$ represents long term fading between the RN and the receiving UE.

Figure 12:
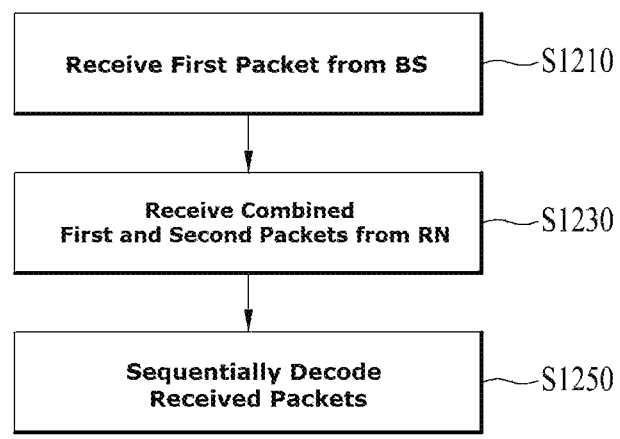
FIG. 12 is a flowchart illustrating a method for receiving content based on the caching scheme by a UE according to another embodiment of the present disclosure.

FIG. 12 is a flowchart illustrating a method for receiving content based on the above caching scheme by a UE according to another embodiment of the present disclosure.

Referring to FIG. 12, if the UE receives a first packet from a BS, and an RN succeeds in overhearing and combines the first packet with a second packet in step S1210, the UE receives the combined first and second packets from the RN in step S1230. The combined packets may be received at a time scheduled for the second packet. The UE decodes packets sequentially based on the received packets and recovers content in step S1250. More specifically, the content may be reproduced in the following manner.

A decoder of the UE sequentially decodes the packets received from the BS and the RN based on the above-described decoding failure probabilities. Among the packets, successfully decoded packets are transmitted to and stored in a buffer, for frame recovery. Even though decoding of some packets may be failed due to fading occurring in a wireless communication system, the content may be made less sensitive to errors by Maximum Distance Separable (MDS) coding such as Reed-Solomon coding before the content is transmitted on a radio channel. Therefore, a frame may be recovered using some successfully decoded packets of the frame.

If recovered frames are sequentially reproduced, the user may appreciate desired content. If a frame is not successfully recovered and thus not reproduced, a screen of a successfully recovered frame previous to the frame may be utilized, or a few successfully decoded packets may be reproduced instead of the frame.

While it has been described in the foregoing embodiment that packets at even-numbered positions are stored in a cache memory, as a method for storing packets at uniform positions, which should not be construed as limiting the scope of the present disclosure, other caching methods for using signal overhearing, for example, random caching for uniform distribution or caching for spacing stored packets from each other by as much as possible may also be considered.

Further, the present disclosure is applicable to a UE-relay environment based on cooperation between users within a cell as well as a relay-based communication system in which a BS transmits content to a user directly or indirectly through an RN. To increase quality of experience for a specific user receiving content from a BS, other users adjacent to the user may store parts of the content in their cache memories and thus effectively help the user with reception of the content from the BS, as illustrated in FIG. 3.

According to the present disclosure, the quality of content that a user experiences may be increased by a caching scheme using a cache memory, and a content transmission scheme based on the caching scheme. An RN may uniformly store, in its cache memory, packets of popular content listed in a list of content to be frequently requested. When a BS transmits a part of the content not stored in the cache memory to a user, the RN performs overhearing to decode the data and thus recover the content opportunistically. The RN combines the content that the RN has with the recovered signal, and may help the user to effectively reproduce the content. With the assistance of the RN, a content transmission error rate may be decreased, thereby increasing the reproduction quality of the content.

Figure 13:
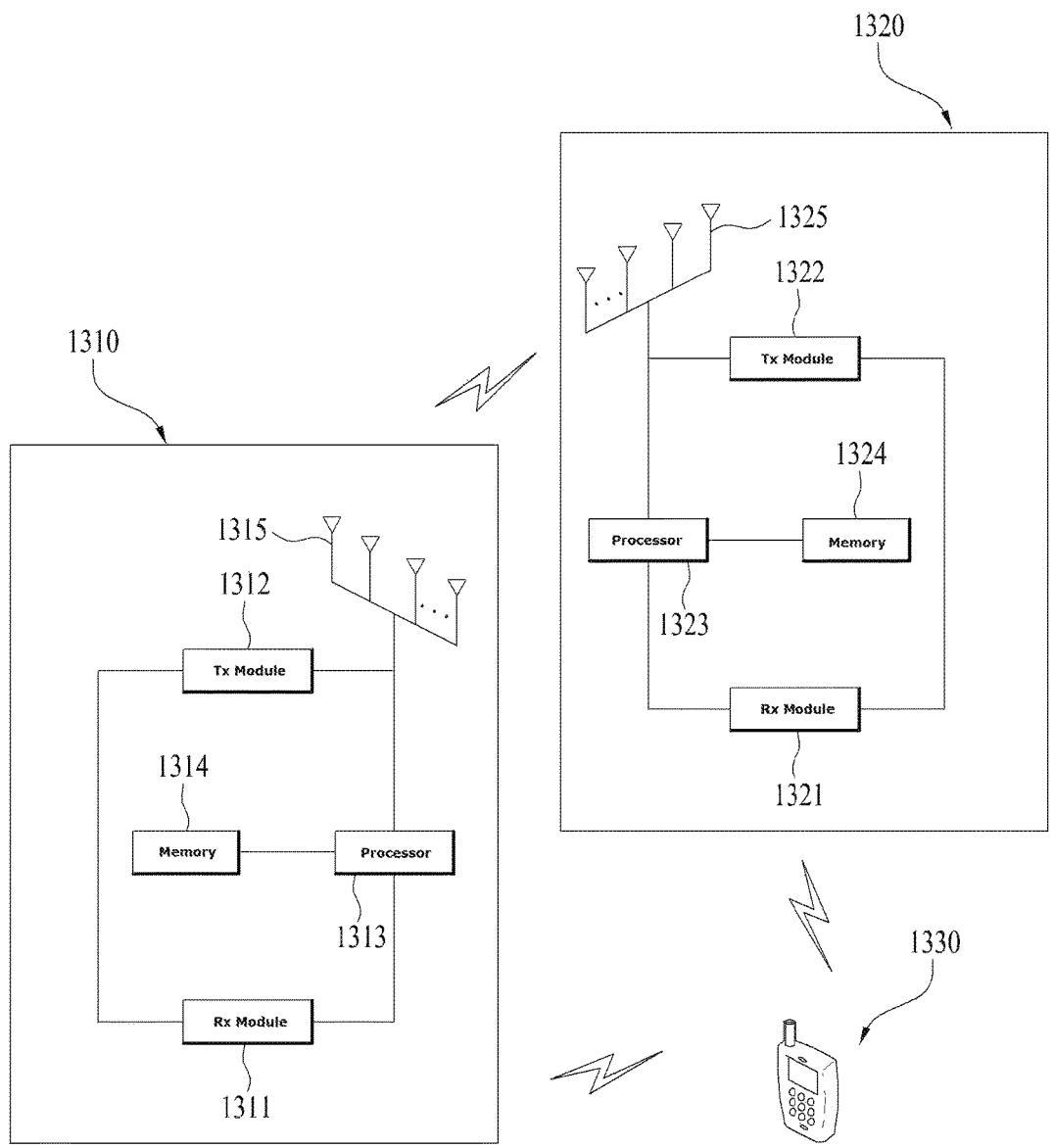
FIG. 13 is a block diagram illustrating a wireless communication system including a Base Station (BS), an RN, and a UE according to the present disclosure.

FIG. 13 is a view illustrating a wireless communication system including a BS, an RN, and a UE according to the present disclosure.

Referring to FIG. 13, a BS 1310 according to the present disclosure may include an Rx module 1311, a Tx module 1312, a processor 1313, a memory 1314, and a plurality of antennas 1315. The plurality of antennas 1315 mean that the BS 1310 supports MIMO transmission and reception. The Rx module 1311 may receive UL signals, data, and information from at least one of a UE and an RN. The Tx module 1312 may transmit DL signals, data, and information to at least one of a UE and an RN. The processor 1313 may provide overall control to the BS 1310.

The processor 1313 of the BS 1310 may compute and process information received by the BS 1310 or information to be transmitted to the outside. The memory 1314 may store computed and processed data for a predetermined time, and may be replaced with a component such as a buffer (not shown).

Referring to FIG. 13, an RN 1320 according to the present disclosure may include an Rx module 1321, a Tx module 1322, a processor 1323, a memory 1324, and a plurality of antennas 1325. The plurality of antennas 1325 mean that the RN 1320 supports MIMO transmission and reception. The Rx module 1321 may include a first Rx module and a second Rx module. The first Rx module may receive DL signals, data, and information from a BS, and the second Rx module may receive UL signals, data, and information from a UE. The Tx module 1322 include a first Tx module and a second Tx module. The first Tx module may transmit UL signals, data, and information to a BS, and the second Tx module may transmit DL signals, data, and information to a UE. The processor 1323 may provide overall control to the RN 1320.

The processor 1323 of the RN 1320 may compute and process information received by the RN 1320 or information to be transmitted to the outside. The memory 1324 may store computed and processed data for a predetermined time. and may be replaced with a component such as a buffer (not shown). The memory 1324 may include a cache memory for caching according to the present disclosure.

Like the BS 1310, a UE 1330 according to the present disclosure may include an Rx module, a Tx module, a processor, a memory, and a plurality of antennas. The plurality of antennas mean that the UE 1330 supports MIMO transmission and reception. The Rx module may receive DL signals, data, and information from at least one of a UE and RN. The Tx module may transmit UL signals, data, and information to at least one of a UE and an RN. The processor may provide overall control to the UE 1330.

The above BS, UE, and RN may be configured so that the foregoing various embodiments of the present disclosure may be implemented independently or two or more of them may be applied at the same time. For clarity, a redundant description is avoided.

In the exemplary description of FIG. 13, the BS 1310 may correspond to a source node S, the RN 1320 may correspond to a relay R, and the UE 1330 may correspond to a destination node D in the foregoing examples.

Further, the description of the BS 1310 illustrated in FIG. 13 is also applicable to an RN that autonomously controls a cell. The description of the RN 1320 illustrated in FIG. 13 is also applicable to a UE (i.e., a UE-relay) that helps another UE 1330 in a cooperative communication environment.

Figure 14:
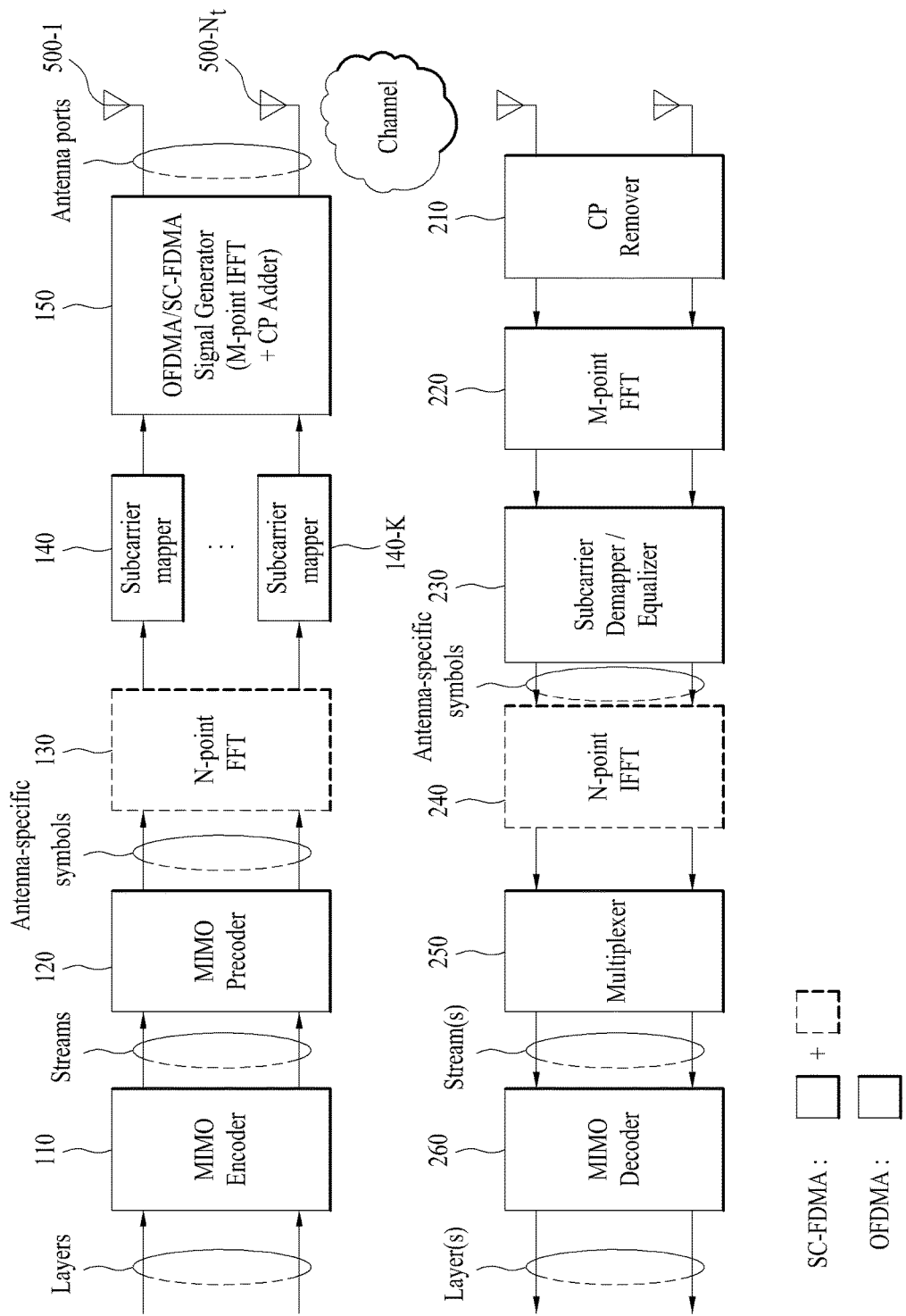
FIG. 14 is a block diagram illustrating an exemplary transmission module in each of a UE and a BS.

FIG. 14 is a block diagram illustrating an exemplary Tx modules in each of a UE and a BS. With reference to FIG. 14, an operation of the Tx module will be described below in detail.

Each of OFDMA transmitters 100*a* and 100*b* includes a MIMO encoder, a MIMO precoder, subcarrier mappers, an OFDMA signal generator, and Nt Tx antennas.

The MIMO encoder 110 generates coded data by encoding data streams to be transmitted in a predetermined coding scheme and maps the coded data to symbols representing positions on a signal constellation by modulating the coded data. The data streams input to the MIMO encoder 110 may be acquired by subjecting data blocks received from the Medium Access Control (MAC) layer to various signal processes such as channel encoding, interleaving, and scrambling. The data streams may be referred to as codewords or layers, and are equivalent to data blocks provided by the MAC layer. The data blocks provided by the MAC layer are also called transport blocks. The present disclosure is not limited to any specific modulation scheme, and m-Phase Shift Keying (m-PSK) or m-Quadrature Amplitude Modulation (m-QAM) are available for modulation of the coded data. The MIMO encoder 110 may be provided with a modulator as an independent module, for modulation of coded data. Meanwhile, the MIMO encoder 110 may define MIMO streams of input symbols to the MIMO precoder 120 so that the MIMO precoder 120 may distribute antenna-specific symbols to corresponding antenna paths. The MIMO streams refer to information paths input to the MIMO precoder 120. Information paths before the MIMO precoder 120 may be regarded as virtual antennas or MIMO streams. To define the MIMO streams of symbols, the MIMO encoder 110 may have a MIMO stream mapper as an independent module.

The MIMO precoder 120 outputs antenna-specific symbols by processing the input symbols in a MIMO scheme based on multiple Tx antennas, and distributes the antenna-specific symbols to subcarrier mappers 140-1, . . . , 140-K. That is, MIMO stream-to-antenna mapping is performed by the MIMO precoder 120. The MIMO precoder 120 may multiply an output x of the MIMO encoder 110 by an NtxMt precoding matrix W and output the product as an NtxMF matrix z.

The subcarrier mappers 140-1, . . . , 140-K allocate the antenna-specific symbols to appropriate subcarriers and multiplex them according to UEs. Meanwhile, the subcarrier mappers 140-1, . . . , 140-K may include an LRU allocation block (not shown) for dividing modulated symbols into segments each having an LRU size and allocating each segment to an LRU. Further, each of the subcarrier mappers 140-1, . . . , 140-K may include a mapping block (not shown) for mapping an LRU to a data burst. The data burst is allocated to a PRU in a physical frequency area. Therefore, the subcarrier mappers 140-1, . . . , 140-K function to map modulated data to subcarriers according to an LRU-to-PRU mapping relationship.

An OFDMA signal generator 150 outputs an OFDMA symbol by modulating the antenna-specific symbols in OFDMA. The OFDMA signal generator 150 may perform Inverse Fast Fourier Transform (IFFT) on the antenna-specific symbols, and insert a CP to the time-domain IFFT symbol. The OFDMA symbol is transmitted to a receiver through Tx antennas 500-1, . . . , 500-Nt after digital-to-analog conversion, frequency upconversion, and so on. The OFDMA signal generator 150 may include an IFFT module, a CP inserter, a Digital-to-Analog Converter (DAC), a frequency upconverter, and so on.

A signal process of an OFDMA receiver is performed in a reverse order of the signal process of the OFDMA transmitter. Specifically, the OFDMA receiver decodes and demodulates external radio signals received through antennas 500*a* and 500*b*, and provides the demodulated signals to a corresponding processor. The antennas 50*a* and 500*b* connected to the OFDMA receiver may include Nr multiple Rx antennas. After each of signals received through the Rx antennas is recovered to a baseband signal, the signal is recovered to an original data stream transmitted by the transmitter 100*a* or 100*b* through multiplexing and MIMO demodulation. The OFDMA receiver may include a signal recoverer 210 to 230 for recovering received signals to baseband signals, a multiplexer 250 for multiplexing the reception-processed signals by combining them, and a MIMO decoder 260 for recovering signal streams to data streams. The signal recoverer, the multiplexer, and the MIMO decoder may be configured as a single integrated module or independent modules. More specifically, the signal recoverer may include an Analog-to-Digital Converter (ADC) for converting an analog signal to a digital signal, a CP remover 210 for removing a CP from the digital signal, an FFT module 220 for outputting frequency-domain symbols by Fast Fourier Transform (FFT)-processing the CP-free signal, and a subcarrier demapper/equalizer 230 for recovering the frequency-domain symbols to antenna-specific symbols. The antenna-specific symbols are recovered to MIMO streams by the multiplexer 250, and the MIMO streams are recovered to data streams that a transmission apparatus intends to transmit, by the MIMO decoder 260.

Meanwhile, compared to the OFDMA transmitter, an SC-FDMA transmitter further includes an FFT module 130 before the subcarrier mappers 140-1, . . . , 140-K. The SC-FDMA transmitter may significantly reduce the Peak-to-Average Power Ratio (PAPR) of a transmission signal by spreading a plurality of data in the frequency domain through FFT before IFFT, relative to OFDMA. An SC-FDMA receiver further includes an IFFT module 240 after the subcarrier demapper 230, compared to the OFDMA receiver. A signal process of the SC-FDMA receiver is performed in a reverse order of the process of the SC-FDMA transmitter.

Each processor of a transmission apparatus and a reception apparatus is connected to a corresponding transmitter and controls the operations of the foregoing components. For reference, while it has been described in FIG. 14 that the MIMO encoder 110, the MIMO precoder 120, the subcarrier mappers 140-1, . . . , 140-K, the OFDMA/SC-FDMA signal generator 150 are included in each of the transmitters 100a and 100b, the processor of the transmission apparatus may be configured to include the MIMO encoder 110, the MIMO precoder 120, the subcarrier mappers 140-1, . . . , 140-K, the OFDMA/SC-FDMA signal generator 150. Similarly, while it has been described in FIGS. 2 and 3 that the signal recoverer, the multiplexer, and the MIMO decoder are included in the receiver, the processor of the reception apparatus may be configured to include the signal recoverer, the multiplexer, and the MIMO decoder. For the convenience of description, it is assumed that the MIMO encoder 110, the MIMO precoder 120, the subcarrier mappers 140-1 . . . , 140-K, the OFDMA/SC-FDMA signal generator 150 are included in each of the transmitters 100a and 100b configured separately from the processor that controls the operations of the components, and the signal recoverer, the multiplexer, and the MIMO decoder are included in the receiver configured separately from the processor that controls the operations of the components. However, the embodiments of the present disclosure are also applicable to the case where the MIMO encoder 110, the MIMO precoder 120, the subcarrier mappers 140-1, . . . , 140-K, the OFDMA/SC-FDMA signal generator 150 are included in the processor of the transmission apparatus, and the signal recoverer, the multiplexer, and the MIMO decoder are included in the processor of the reception apparatus.

The above-described embodiments of the present disclosure may be implemented through various means. For example, the embodiments of the present disclosure may be implemented by hardware, firmware, software, or a combination thereof.

In hardware implementation, a scheme according to embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In firmware or software implementation, a scheme according to embodiments of the present disclosure may be implemented in the form of a module, a procedure, a function, etc. performing a function or an operation described above. Software code may be stored in a memory unit and executed by a processor. The memory unit may be located inside of the processor or outside thereof to transmit and receive data to and from the processor via various known means.

Detailed description of the preferred embodiments of the present disclosure disclosed as above is provided so that those skilled in the art may implement and carry out the present disclosure. Although description has been made by referring to the preferred embodiments of the present disclosure, it is understood that those skilled in the art may variously correct and modify the present disclosure within the scope of the present disclosure. For example, those skilled in the art may use the configurations described in the above-described embodiments by combining the configurations. Therefore, the present disclosure is not limited to the embodiments mentioned above, and is intended to include the widest scope matching the principles and new characteristics disclosed herein.

The present disclosure may be embodied in other specific forms without departing from the spirit and characteristics of the present disclosure. Thus, the descriptions are to be considered in all respects as illustrative and not restrictive. The scope of the present disclosure should be determined by reasonable interpretation of the appended claims and all change which comes within the equivalent scope of the disclosure are within the scope of the disclosure. The present disclosure is not limited to the embodiments mentioned above, and is intended to include the widest scope matching the principles and new characteristics disclosed herein. In addition, some claims not explicitly referring to one another in the claims may be combined to constitute an embodiment or to be included as a new claim by means of amendment after the application is filed.

INDUSTRIAL APPLICABILITY

The embodiments of the present disclosure described above are applicable to various mobile communication systems.

The invention claimed is:

1. A method for transmitting content using a cache memory by a relay node (RN), the method comprising:
storing, in the cache memory, a first packet among a plurality of packets included in the content;
receiving a second packet among the plurality of packets included in the content from a base station (BS), wherein the second packet is not pre-stored in the cache memory;
decoding the second packet; and
if the second packet is successfully decoded, combining the first packet with the second packet, and transmitting the combined packets to a user equipment (UE),
wherein the first packet and the second packet are transmitted together in resources allocated to the first packet, and
wherein the second packet is transmitted at a ratio of α with respect to the resources allocated to the first packet, the first packet is transmitted at a ratio of 1-α with respect to the resources allocated to the first packet, and α is a parameter for adjusting a combination between the first packet and the second packet and determined based on a probability of decoding failure of the first packet and a probability of decoding failure of the second packet.

2. The method according to claim 1, wherein packets stored in the cache memory and packets that are not stored in the cache memory are distributed uniformly.

3. The method according to claim 1, wherein the first packet has an even-numbered index, and the second packet has an odd-numbered index.

4. The method according to claim 1, wherein the first packet is combined with the second packet based on superposition coding.

5. The method according to claim 1, wherein the first packet is combined with the second packet based on orthogonal time division.

6. The method according to claim 1, wherein the content is transmitted in a plurality of frames, and the number of packets stored for an ith frame among the plurality of frames in the cache memory is determined by equation 1, and equation 1 is $$P1: \max_{X_1,\ldots,X_F} \min_i (P_i^{succ} PSNR_i)$$

subject to $$\sum_{i=1}^{F} X_i \leq M,$$

$$X_i \in \{0, \ldots, N_i\}, \forall i$$

where $p_i^{succ}$ represents a probability of successfully reproducing the ith frame, PSNRi represents a peak signal-to-noise ratio (PSNR) of the ith frame, F represents the number of frames included in the content, M represents the number of packets storable in the cache memory, and $N_i$ represents the number of packets required to transmit the ith frame.

7. The method according to claim 1, wherein α is determined by equation 2 and equation 3, equation 2 is $$\epsilon^{coop}(\alpha) = Pr[\log_2(1 + |h_{SD}|^2 \gamma_{SD}) + \alpha \log_2(1 + |h_{RD}|^2 \gamma_{RD}) < R]$$

$$= 1 - \exp\left(\frac{1 - 2^{R/\alpha}}{\gamma_{RD}}\right) - \int_0^{2^{R/\alpha}-1}$$

$$\frac{1}{\gamma_{RD}} \exp\left(-\frac{y}{\gamma_{RD}} - \frac{2^R - (1+y)^\alpha}{(1+y)^\alpha \gamma_{SD}}\right) dy$$

and equation 3 is $$\epsilon^{RD,2}(\alpha) = Pr[(1-\alpha)\log_2(1 + |h_{RD}|^2 \gamma_{RD}) < R]$$

$$= \left(1 - \exp\left(-\frac{2^{R/(1-\alpha)} - 1}{\gamma_{RD}}\right)\right)$$

where $\epsilon coop(\alpha)$ represents a probability of failing in decoding an odd-numbered packet at a receiving UE, when the RN succeeds in overhearing, hSD represents short term fading between the BS and the receiving UE, γSD represents long term fading between the BS and the receiving UE, hRD represents short term fading between the RN and the receiving UE, γRD represents long term fading between the RN and the receiving UE, R represents the amount of transmitted data, and ∈RD,2(α) represents a probability of failing in decoding an even-numbered packet at the receiving UE, when the RN succeeds in overhearing.

8. The method according to claim 1, wherein if a part of the content is stored in the cache memory, hybrid automatic repeat request (HARQ) response information for the content is transmitted.

9. The method according to claim 8, wherein the response information is an acknowledgment (ACK).

10. A method for receiving content using caching by a user equipment (UE), the method comprising:
receiving a first packet included in the content from a base station (BS);
receiving, from a relay node (RN), combined first and second packets at a time scheduled for the second packet; and
recovering a frame based on at least the first packet and the second packet,
wherein the first packet and the second packet are received together in resources allocated to the first packet, and
wherein the second packet is received at a ratio of α with respect to the resources allocated to the first packet, the first packet is received at a ratio of 1-α with respect to the resources allocated to the first packet, and α is a parameter for adjusting a combination between the first packet and the second packet and determined based on a probability of decoding failure of the first packet and a probability of decoding failure of the second packet.

11. A relay node (RN) for transmitting content using a cache memory, the RN comprising:
a cache memory for configured to store a first packet among a plurality of packets included in the content;
a processor configured to receive a second packet among the plurality of packets included in the content from a base station (BS), wherein the second packet is not pre-stored in the cache memory, decode the second packet, and if the second packet is successfully decoded, combine the first packet with the second packet; and
a transceiver configured to transmit the combined packets to a user equipment (UE),
wherein the first packet and the second packet are transmitted together in resources allocated to the first packet, and
wherein the second packet is transmitted at a ratio of α with respect to the resources allocated to the first packet, the first packet is transmitted at a ratio of 1-α with respect to the resources allocated to the first packet, and α is a parameter for adjusting a combination between the first packet and the second packet and determined based on a probability of decoding failure of the first packet and a probability of decoding failure of the second packet.

12. A user equipment (UE) for receiving content using caching, the UE comprising:
a transceiver configured to receive a first packet included in content from a base station (BS), and receive, from a relay node (RN), combined first and second packets at a time scheduled for the second packet;
a memory; and
a processor configured to recover a frame based on at least the first packet and the second packet,
wherein the first packet and the second packet are received together in resources allocated to the first packet, and
wherein the second packet is received at a ratio of α with respect to the resources allocated to the first packet, the first packet is received at a ratio of 1-α with respect to the resources allocated to the first packet, and α is a parameter for adjusting a combination between the first packet and the second packet and determined based on a probability of decoding failure of the first packet and a probability of decoding failure of the second packet.

* * * * *